US007890698B2

(12) United States Patent
Kakihara et al.

(10) Patent No.: US 7,890,698 B2
(45) Date of Patent: Feb. 15, 2011

(54) DISK ARRAY APPARATUS INCLUDING CONTROL PACKAGES EACH HAVING A BASE PACKAGE AND A FUNCTIONAL PACKAGE HIERARCHICALLY CONNECTED TO THE BASE PACKAGE

(75) Inventors: Shinobu Kakihara, Odawara (JP); Kenji Mori, Odawara (JP)

(73) Assignee: Hitachi, Ltd., Tokyo (JP)

( * ) Notice: Subject to any disclaimer, the term of this patent is extended or adjusted under 35 U.S.C. 154(b) by 1554 days.

(21) Appl. No.: 11/127,205

(22) Filed: May 12, 2005

(65) Prior Publication Data
US 2006/0253863 A1 Nov. 9, 2006

(30) Foreign Application Priority Data
Mar. 7, 2005 (JP) ............................. 2005-062097

(51) Int. Cl.
*G06F 12/00* (2006.01)
(52) U.S. Cl. ..................................................... 711/114
(58) Field of Classification Search .................. 711/114
See application file for complete search history.

(56) References Cited

U.S. PATENT DOCUMENTS

| 5,600,783 | A | | 2/1997 | Kakuta et al. |
| 5,717,893 | A | * | 2/1998 | Mattson ....................... 711/129 |
| 5,761,697 | A | * | 6/1998 | Curry et al. .................. 711/100 |
| 5,790,890 | A | * | 8/1998 | Mirov et al. .................... 710/15 |
| 5,838,891 | A | | 11/1998 | Mizuno et al. |
| 7,134,011 | B2 | * | 11/2006 | Fung ........................... 713/100 |
| 7,209,981 | B1 | * | 4/2007 | Wade et al. ..................... 710/38 |
| 7,222,259 | B2 | | 5/2007 | Tanaka et al. |
| 7,272,735 | B2 | * | 9/2007 | Fung ........................... 713/320 |
| 7,305,670 | B2 | | 12/2007 | Ogasawara et al. |
| 7,424,639 | B2 | | 9/2008 | Tanaka et al. |
| 2008/0133942 | A1 | | 6/2008 | Ogasawara et al. |

FOREIGN PATENT DOCUMENTS

| JP | 7-230362 | 8/1995 |
| JP | 8-137631 | 5/1996 |
| JP | 8-263225 | 10/1996 |
| JP | 9-6549 | 1/1997 |
| JP | 10-269024 | 10/1998 |
| JP | 2001-306265 | 11/2002 |
| JP | 2004-227100 | 8/2004 |
| JP | 2004-272527 | 9/2004 |

OTHER PUBLICATIONS

Office Action in JP 2005-062097, dated Jun. 22, 2010 (2 pages), [in Japanese].

* cited by examiner

*Primary Examiner*—Hetul Patel
(74) *Attorney, Agent, or Firm*—Antonelli, Terry, Stout & Kraus, LLP.

(57) ABSTRACT

A disk array apparatus improves scalability, performance such as data transfer between different kinds of I/Fs, and maintainability and reliability about boards/PKs configuring the DKC and about a DKC configuration obtained by interconnecting them. The DKC in the disk array apparatus is configured by interconnecting mix PKs each including a base PK and a functional PK which is hierarchically connected to the base PK and on which individually separate functions are mounted. The base PK coexists with and is connectable to a plurality of different I/F-PKs, and includes an intra-package interconnection network for communicating between the functional PKs and with the DKC, and further has a processor interconnection network. The DKC performs a data transfer processing by using the functional PK and the base PK.

15 Claims, 19 Drawing Sheets

I/F-PK (Channel I/F-PK)

LCM-PK

MP-PK

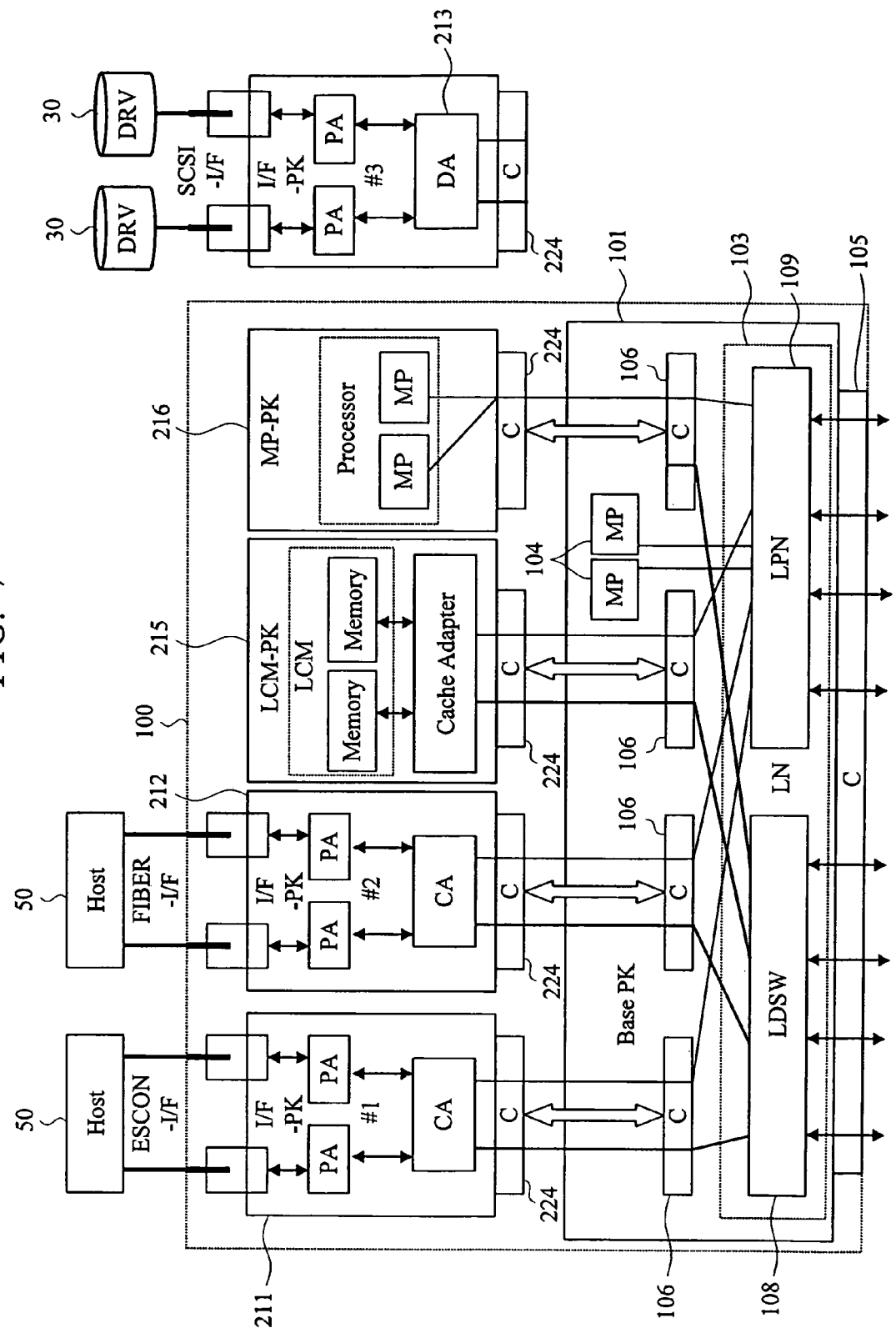

DISK ARRAY APPARATUS INCLUDING CONTROL PACKAGES EACH HAVING A BASE PACKAGE AND A FUNCTIONAL PACKAGE HIERARCHICALLY CONNECTED TO THE BASE PACKAGE

CROSS-REFERENCE TO RELATED APPLICATION

The present application claims priority from Japanese patent application No. JP 2005-62097 filed on Mar. 7, 2005, the content of which is hereby incorporated by reference into this application.

BACKGROUND OF THE INVENTION

The present invention relates to a disk array apparatus (also called "storage apparatus"), which has a storage unit such as a hard disk drive (HDD) and a storage control unit (hereinafter referred to as "DKC") for controlling data storage with respect to the storage unit and is controllable in RAID format. Especially, the present invention relates to a technology for mounting the DKC with a board (circuit board) and its package (hereinafter abbreviated as "PK").

In a conventional disk array apparatus, the DKC is configured by interconnecting the boards on which multiple processing units corresponding to facilities are mounted, for example. The facilities are an I/F (interface) for an external device such as a host computer (hereinafter also called "host") communicatively connected to the DKC, an I/F for a HDD (hereinafter also called "drive"), a memory such as a cache memory (hereinafter referred to as "CM") for caching data, and a switch for transferring data between respective units. The I/F for the external device such as the host (referred to as "channel I/F" or "host I/F") has various types such as a fiber channel (hereinafter referred to as "FC"). The I/F for the HDD (referred to as "disk I/F" or "drive I/F") also has various types such as a SCSI. A processing unit corresponding to the channel I/F is referred to as a channel control unit (CHA). A processing unit corresponding to the disk I/F is referred to as a disk control unit (DKA). In the board corresponding to each facility and/or the PK of the board, the board for each I/F includes a plurality of same kind of I/F ports, wherein a communication processing of the corresponding I/F and a data transfer processing by a DMA (direct memory cell) are performed.

A portion, which mainly includes the board and integrally formed together with an electrical/mechanical structure for mounting/connecting the board to a chassis of the disk array apparatus, will be referred to as a PK in this specification. Each of the PKs constituting the DKC is referred to as a control PK. The PK may have a configuration and a structure in which the PK is inserted and drawn to/from a slot of a box in the chassis.

As one function of the disk array apparatus, it is demanded that the data transfer between different kinds of I/Fs can be performed in one DKC (also called "virtualization"). The different kinds of I/Fs are conventionally provided as the different boards/PKs. The necessary board/PK for each I/F is prepared depending on a system including the host for the user. Therefore, each board/PK for the different kinds of I/Fs is interconnected in order to transfer data between the different kinds of I/Fs corresponding to the plural kinds of I/Fs.

The configuration in which a plurality of same kind of I/F ports are integrated in one board/PK is described as an example of the DKC configuration in Japanese Patent Laid-open No. 2001-306265.

SUMMARY OF THE INVENTION

In the disk array apparatus, its performance must be further improved in order to meet the demands of users. A system for the disk array apparatus preferably has scalability so that the number and the performance of I/F ports can be flexibly changed depending on a system and a request of user in order to reduce the cost. Additionally, it is intended that the DKC flexibly responds to the data transfer between the different kinds of I/Fs and to the connection to another company's products, and further intended that the performance of the data transfer is improved.

In the conventional DKC, a microprocessor (MP) is provided for each function such as the CHA for executing the host I/F control and the DKA for executing the drive I/F control to control a transfer path. However, since the conventional DKC supports only the kind of IF determined for each control PK, the number of ports and that of processors are increased more than necessary at a time of configuring the disk array apparatus, for example, at a time of the minimum configuration and/or another control PK is required to add different kinds of I/F ports. Thus, it is difficult to provide a system configuration fully satisfying the user's request. In some cases, the processor of the transfer path not to be connected/used cannot effectively utilized, that is, a load can not be distributed using the processor. Additionally, when data is transferred between the different kinds of I/Fs, a common connection network to the DKC must be used, so that the transfer performance is suppressed and other data transfer is affected. Therefore, the system performance of the apparatus is also affected.

The present invention is made in consideration of the above-described problem. An object of the present invention is to a technique for improving the scalability, the performance such as the data transfer between the different kinds of I/Fs, and the maintainability and reliability about the boards or their PKs configuring the DKC and about a DKC configuration obtained by interconnecting the boards and PKs.

Outlines of representative ones of inventions disclosed in the present application will be briefly described as follows. In order to achieve the object, the disk array apparatus of the present invention comprises the storage unit such as HDD and the storage control unit (DKC) for controlling storing of data into the storage unit, can be controlled in RAID format, and performs the data input/output processing to the storage volume on the storage unit in response to the data input/output request from the external device such as the host, wherein the following technical means is provided.

In the disk array apparatus of the present invention, the DKC is configured by interconnecting the control PKs including the boards. The control PK comprises a PK serving as a base for the interconnection to the DKC (referred to as "base PK") and a PK which is hierarchically connected to the base PK and on which individually separate functions are mounted (functional PK). The DKC is provided as a functional PK or board mounting the functions such as a I/F, a memory, and a processor individually separated, and the different kinds of I/Fs can coexist in the same control PK and are hierarchically connected. Each function serves as a I/F-PK, a memory PK, and a processor PK. The functional PK is inserted/drawn to/from the slot of the base PK through a junction structure of a connector etc. A combination of the base PK and the functional PK is referred to as a mix PK. Each of the functional PK and the base PK has a structure corresponding to a hot-swap structure. The mix PK provides a characteristic function by combining the functional PKs. By using the communication between the functional PK and the base PK and communication between the base PKs in the DKC, the processor controls a processing including the data transfer between the external device and the storage unit.

The base PK includes a first junction for the interconnection, a second junction coexisting with and capable of connecting a plurality of different kinds of functional PKs, and an intra-package connection network (LN) for communicating between the functional PKs and with the processors. Further, the base PK may include a processor connected to the LN. The processor included in the base PK serves as a processor for controlling the processing in the DKC.

The functional PK includes a junction to the base PK and a processing unit corresponding to the function. The IF-PK mounting the I/F particularly includes an adapter for executing the I/F control and a port for the outside. The memory PK with a memory serves as a local cache memory (LCM) in the DKC. The processor PK with a processor serves as a processor for controlling the processing in the DKC.

The DKC includes a data path control switch (DSW) for transferring the data between the base PKs, and a processor connection network (PN) for inter-processor communication between the base PKs, which serve as a global connection network to which the LN is interconnected for communication between the units each including the base PKs. The DKC further includes a global cache memory (GCM) connected to the DSW, and includes a channel I/F package corresponding to the I/F for the external device and a drive I/F package corresponding to the I/F for the HDD, which serve as the functional PKs.

If the mix PK has the memory PK, the data transfer processing is performed while the data is cached in the memory (LCM). If the I/F-PKs of the different kinds of I/Fs coexist in the mix PK, the data transfer between the different kinds of I/Fs is processed in the mix PK. If the DKC includes both of the LCM and the GCM, the data transfer processing is performed while the data is cached by using both of the LCM and the GCM.

Effects obtained by representative ones of inventions disclosed in the present application will be briefly described as follows. The present invention can achieve improvement of: scalability; performance such as data transfer between different kinds of I/Fs; and maintainability and reliability about boards/PKs configuring the DKC and about a DKC configuration obtained by interconnecting them.

BRIEF DESCRIPTION OF THE DRAWINGS

FIG. 7 is a block diagram showing a configuration example of the mix PK at a time of incorporating the mix PK in a DKC in the disk array apparatus according to the embodiment of the present invention.

DESCRIPTION OF THE PREFERRED EMBODIMENTS

Figure 15:
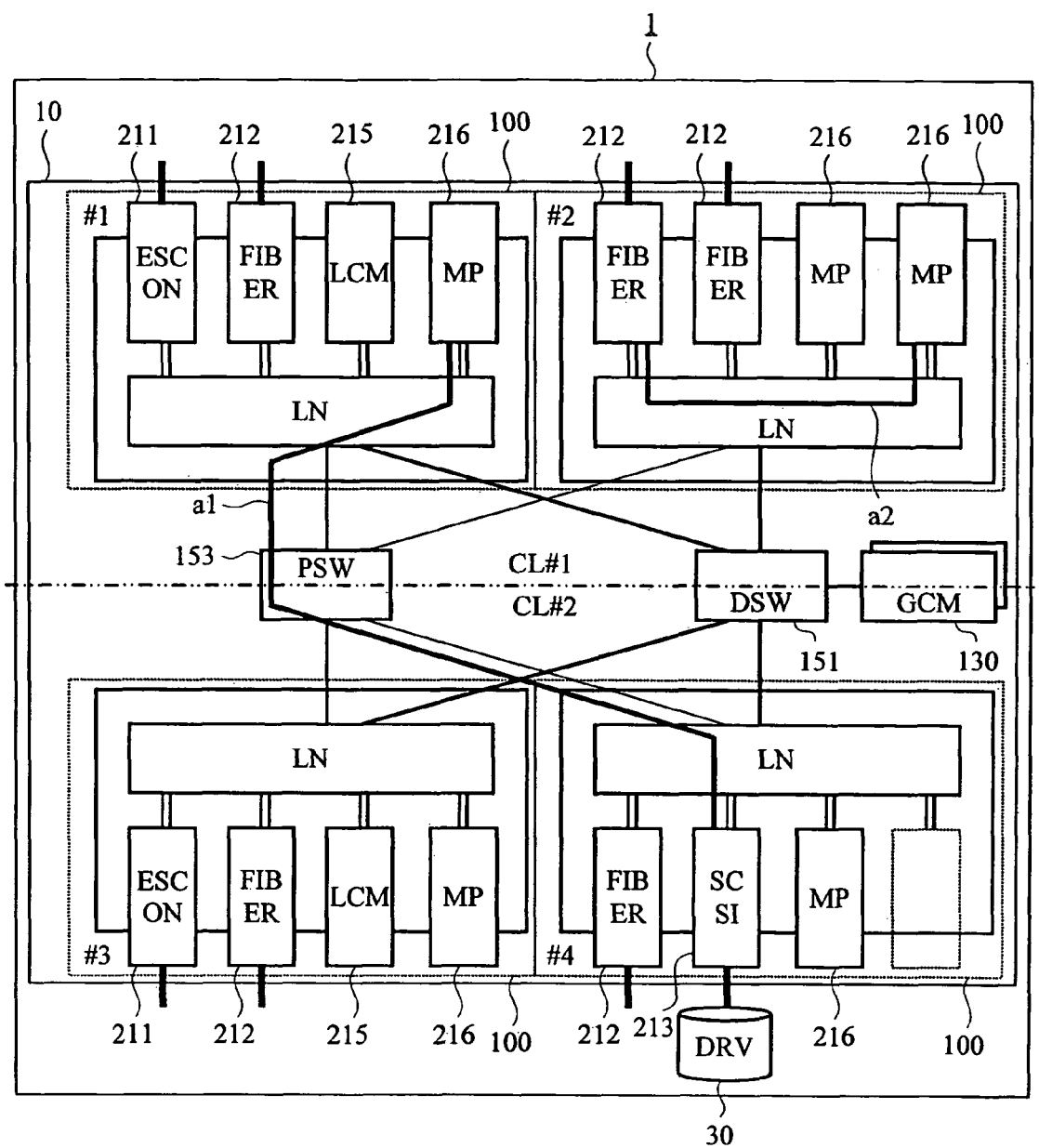
FIG. 15 is a block diagram showing a first configuration example of interconnection and control communication between MPs in the DKC in the disk array apparatus according to the embodiment of the present invention.
Figure 16:
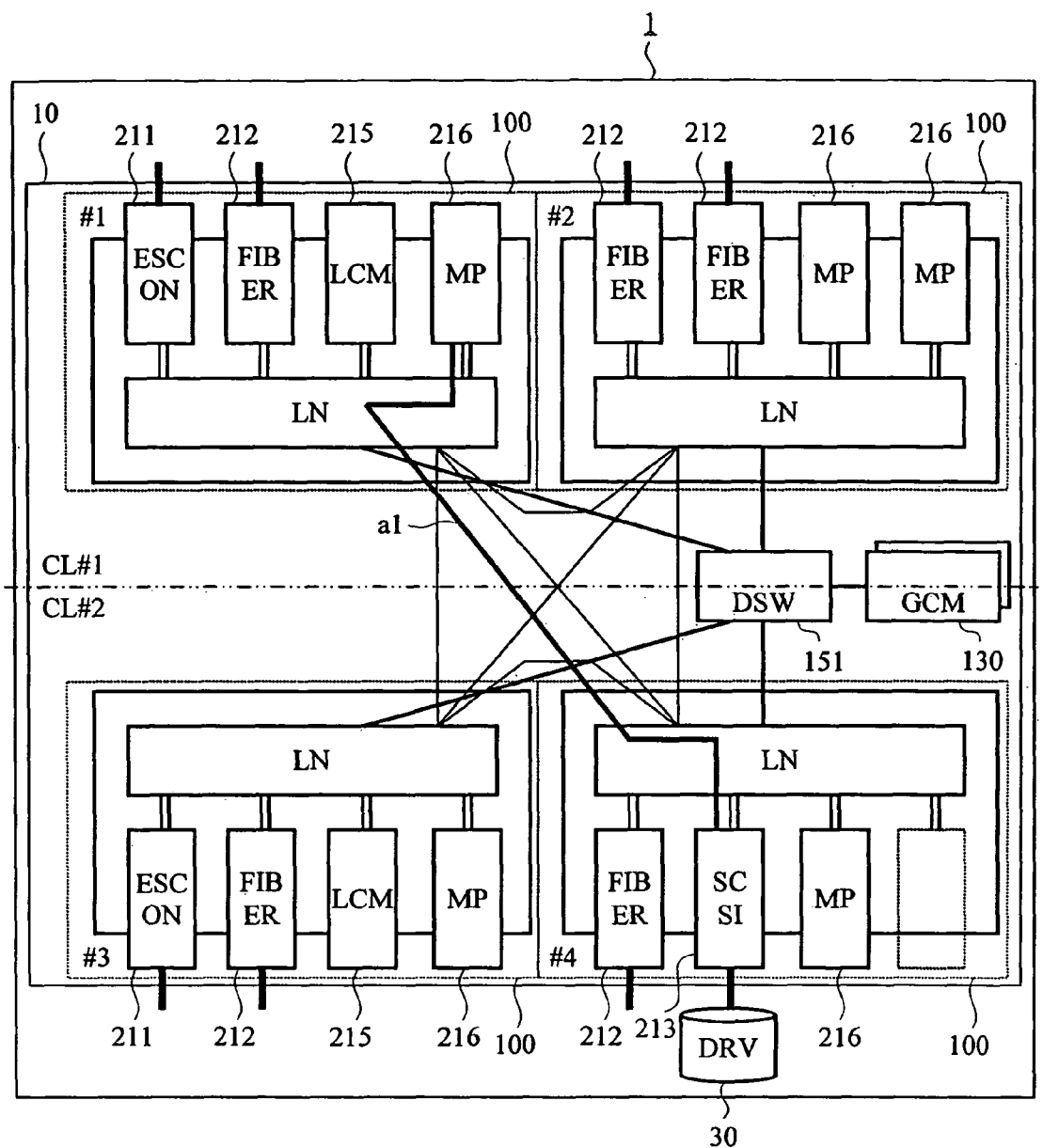
FIG. 16 is a block diagram showing a second configuration example of the interconnection and the control communication between the MPs in the DKC in the disk array apparatus according to the embodiment of the present invention.
Figure 17:
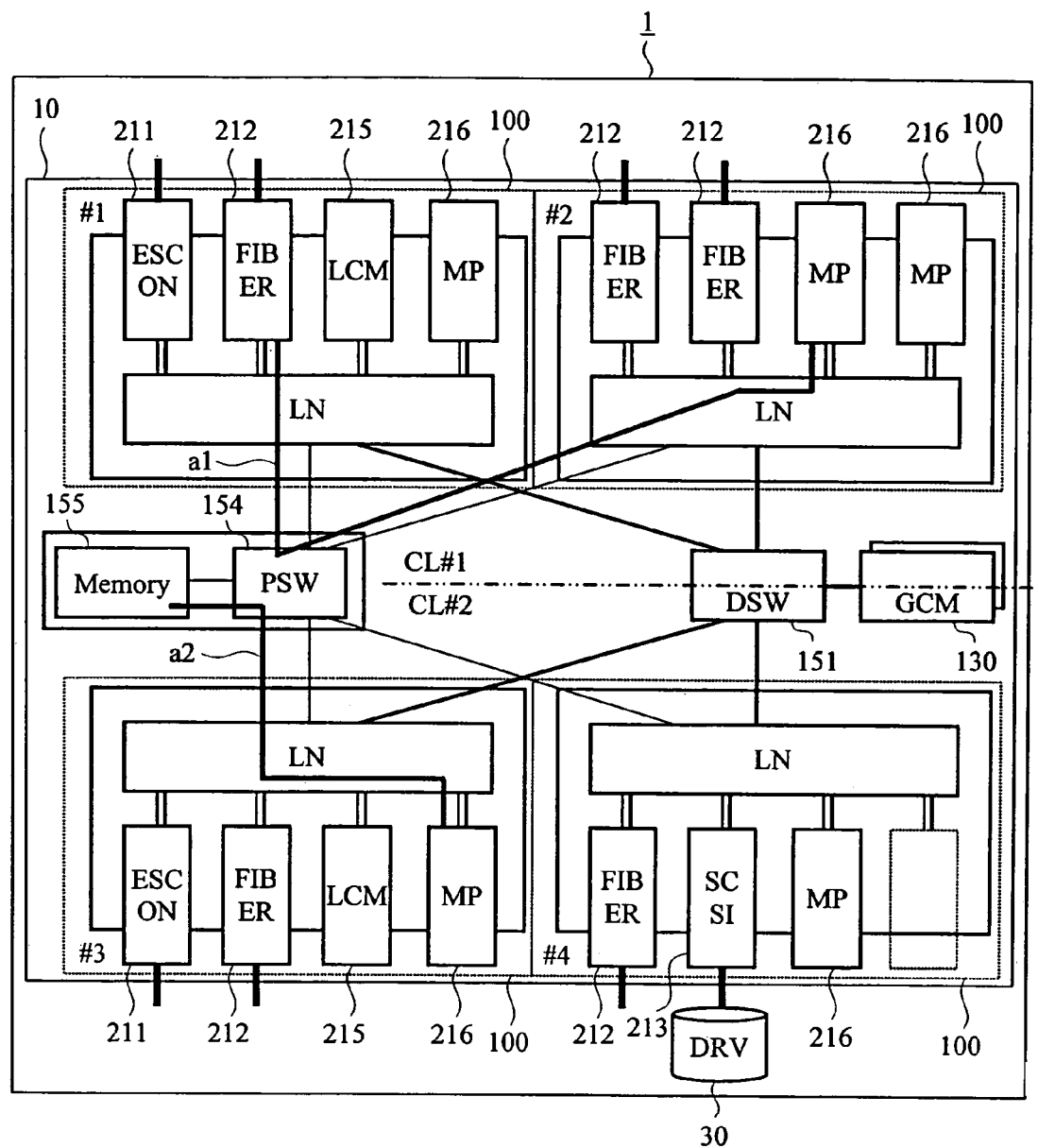
FIG. 17 is a block diagram showing a third configuration example of the interconnection and the control communication between the MPs in the DKC in the disk array apparatus according to the embodiment of the present invention.

Hereinafter, embodiments of the present invention will be described in detail with reference to the drawings. Note that the same reference numeral is denoted in principle to the same components throughout all the drawings for describing the embodiments and the repetition of the description will be omitted. FIGS. 1 to 18 are drawings for explaining a disk array apparatus according to an embodiment of the present invention. FIG. 19 is a drawing for explaining a configuration example of a conventional disk array apparatus. In the present embodiment, each DKC configuration example represented in FIGS. 7 to 9 and other Figures is achieved by combining PKs. Especially, FIGS. 15 to 17 represent aspects of a processor interconnection network (PN) in the present embodiment.

A disk array apparatus 1 according to an embodiment of the present invention will be described. In the present embodiment, a control PK configuring a DKC is configured as a functional PK, which includes mainly an I/F such as a channel I/F and a drive I/F in addition to other separate functions such as a memory and a processor. The functional PKs are configured as an I/F-PK, a memory PK and a processor PK, respectively. Various I/Fs and functions can coexist in the same control PK by combining the functional PKs. The control PK has a hierarchical connection structure in which the functional PKs are freely attachable/detachable to/from a base PK serving as a base for connection. A combination of the base PK and the functional PK is provided as a mix PK instead of a conventional control PK. Each functional PK adopts a hot-swap form, whereby it can be inserted and drawn to/from the base PK in operation. Various I/Fs can be applied as a fiber, a metal, a mainframe system, and a drive I/F. The base PK and the functional PK are freely combined to achieve characteristic functions, so that a DKC configuration flexibly adapted to the number of ports and drives can be provided.

<Appearance of Hardware>

Figure 1:
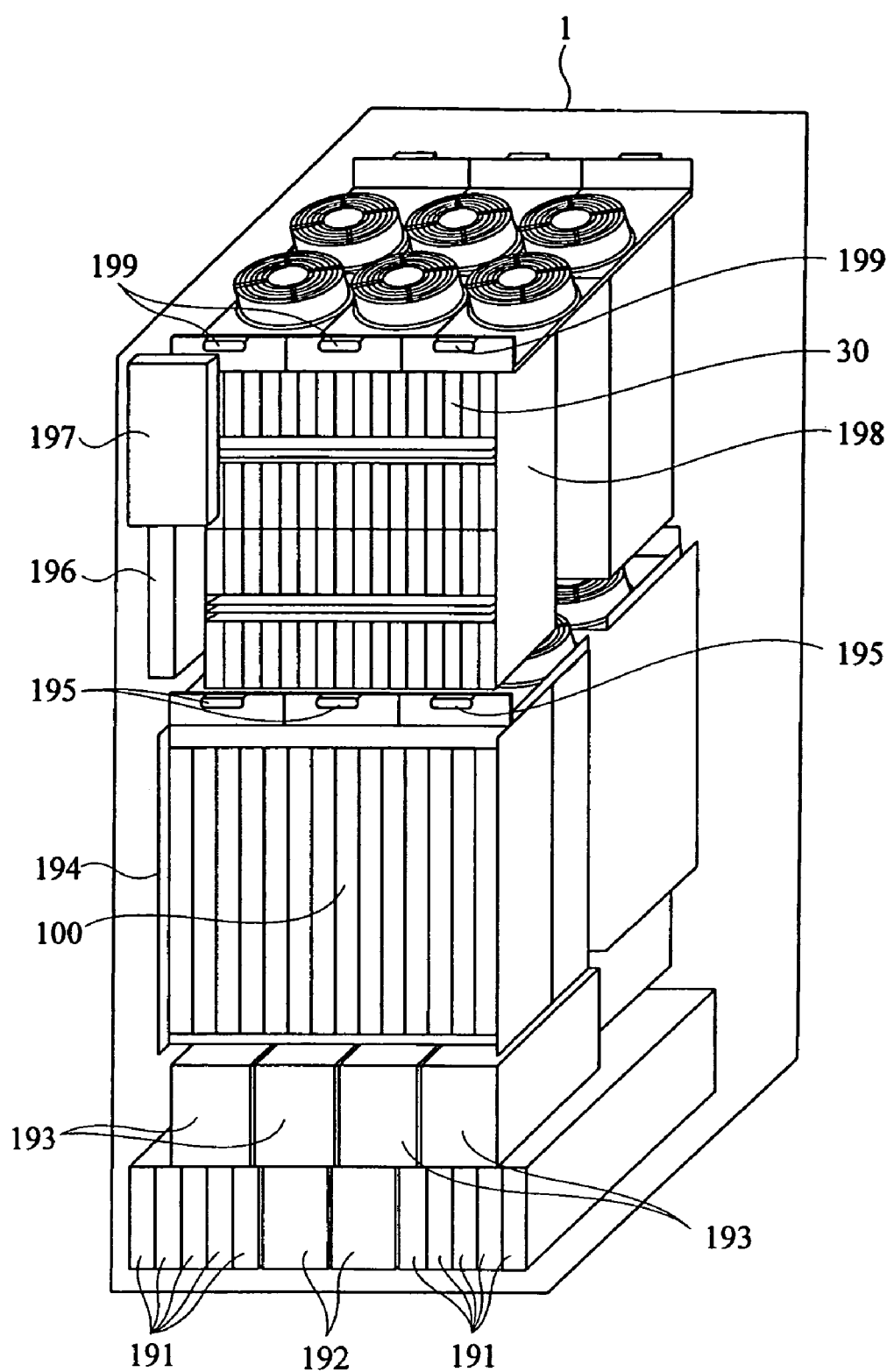
FIG. 1 is a perspective view of an appearance of an entire hardware configuration of a disk array apparatus according to an embodiment of the present invention.

FIG. 1 is a perspective view of an appearance of the entire hardware configuration of the disk array apparatus 1. The disk array apparatus 1 can be composed of a base chassis and an additional chassis. FIG. 1 is shows a front of the base chassis is transparently viewed from an upper-right direction and schematically represents placement of each unit in the chassis. The base chassis is the minimum constitutional unit and includes both of a storage control function given by a DKC 10 etc. and a storage function given by a HDD 30 etc. The additional chassis is an optional unit and has a storage function. The storage control function controls data storage to a storage area provided by the storage function according to a request or command from other devices such as a host communicatively connected thereto. Each chassis is communicatively connected therebetween through communication cables.

In the base chassis, a plurality of batteries 191, a plurality of AC boxes 192, a plurality of AC-DC power sources 193, a DKC box 194, a plurality of fans 195, a SVP 196, a panel 197, a HDD box 198, and a plurality of fans 199 are disposed subsequently from a bottom thereof.

The batteries 191 are connected to the AC-DC power sources 193 to serve as a backup power source at a time of power failure. The AC box 192 is a portion for input AC power and is connected to the AC-DC power sources 193. The AC-DC power source 193 converts the input AC power to DC power and supplies the DC power to each unit such as the DKC 10.

The DKC box 194 includes a plurality of slots capable of mounting the control PK 100 configuring the DKC 10. Each control PK 100 is connected each slot along a guide rail in a manner capable of insertion/draw, and can be replaced in units of control PK 100. The control PK 100 mainly includes boards, on which a function such as the host I/F is mounted, and is integrally modularized together with an electrical/mechanical structure such as a canister to be mounted to the DKC box 194. The DKC 10 can be provided by interconnecting the various control PKs 100. The DKC box 194 includes a backplane (abbreviated as "BP") board 90 for interconnecting the control PKs 100. A connector on a side of each control PK 100 is connected to a connector on a side of the BP board 90 in the slot.

The SVP (maintenance terminal) 196 is a device, which has a processor for taking charge of maintenance and control of the disk array apparatus 1. The SVP 196 is formed of, for example, a note type PC, and is usually accommodated into the chassis and taken out to its front for use in case of necessity. A worker for maintenance can operate the SVP 196 to conduct the maintenance and control. In the panel 197, a switch for a basic operation of the disk array apparatus 1 and an indicator for displaying various pieces of information are arranged. The plurality of fans 195 and 199 provided in the chassis send air to each unit in the chassis, whereby each unit is air-cooled.

Each of the plurality of HDDs 30 configuring a DKU (disk unit) 300 is connected in parallel to the HDD box 198 in the form of a HDU (HDD unit) in a manner capable of insertion/draw. The HDU including the HDD 30 is integrally modularized together with a structure such as a canister for be mounted.

<Information Processing System>

Figure 2:
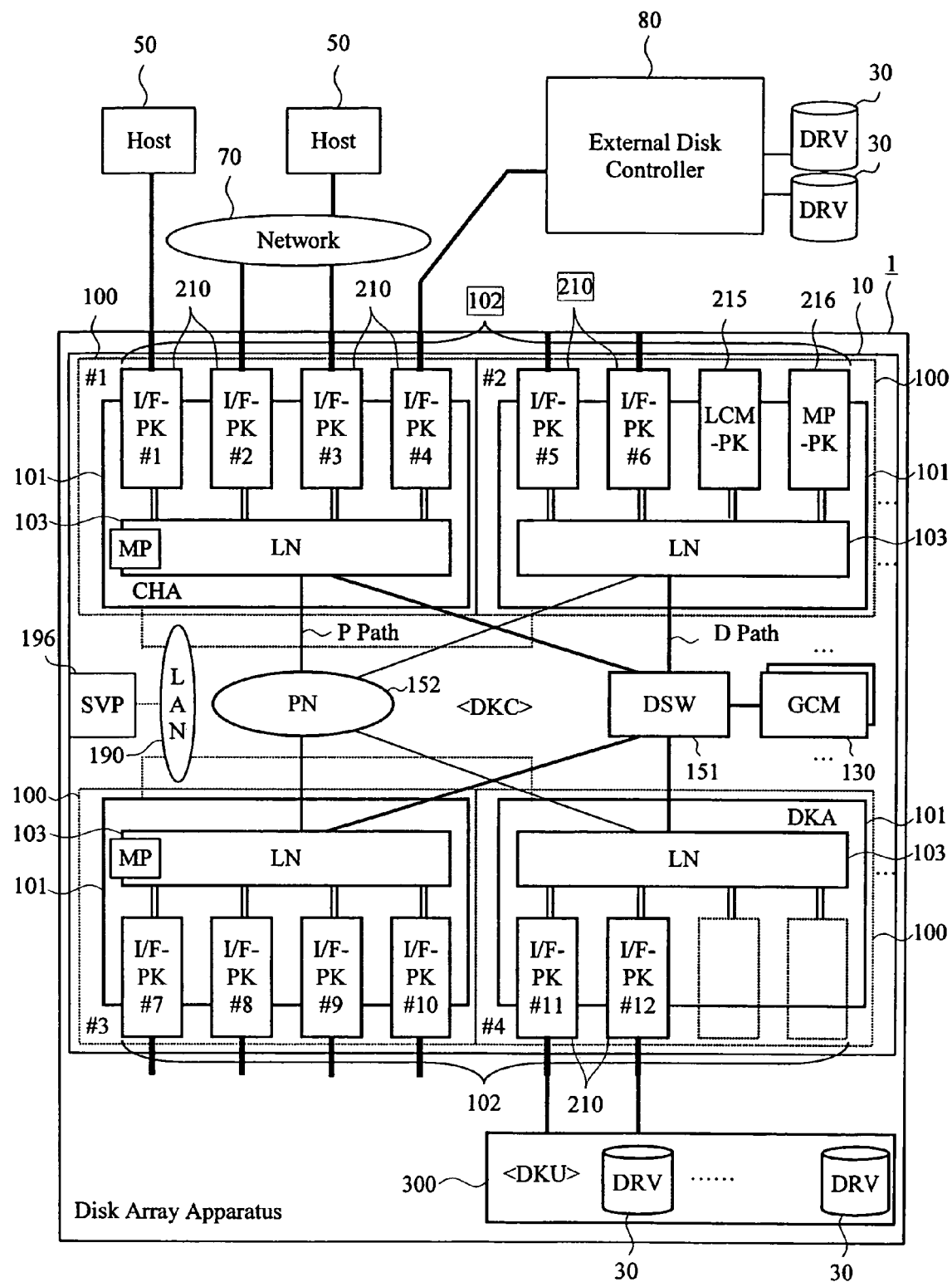
FIG. 2 is a block diagram of an entire configuration of an information processing system including the disk array apparatus according to the embodiment of the present invention.

FIG. 2 is a block diagram showing the entire configuration of the information processing system including the disk array apparatus 1. The information processing system comprises the disk array apparatus 1, a plurality of hosts 50, a network 70, and an external disk controller 80. The hosts 50 and the disk array apparatus 1 are communicatively connected directly or through a network 70. The disk array apparatus 1 and an external disk controller 80 are communicatively connected directly or through the network 70. The external disk controller 80 connects the storage unit such as the HDD (referred to as "DRV" in each Figure) 30.

The disk array apparatus 1 comprises the DKC 10, the DKU 300, and the SVP 196. Particularly, the DKC 10 is configured by interconnecting a plurality of mix PKs 100 on the BP board 90 in the present embodiment. The DKC 10 is communicatively connected to the DKU 300. The DKU 300 includes a plurality of DRVs 30. The DKC 10 reads/writes data with respect to a storage volume on the DRV 30. The DKC 10 can control in RAID format a group of DRVs 30. The SVP 196 is communicatively connected to each mix PK 100 of the DKC 10 through an internal LAN 190.

The host 50 is a high-order device for accessing the disk array apparatus 1 and for inputting/outputting data to the storage volume on the DRV 30 by utilizing the function of the disk array apparatus 1. The communication between the host 50 and the DKC 10 is established through a predetermined I/F. In the I/F between the DKC 10 and the host 50 or external disk controller 80, a mainframe protocol such as FC, FICON (Fibre Connection) (registered trademark) and ESCON (Enterprise System Connection) (registered trademark) and a TCP/IP protocol are used.

The external disk controller 80 is a device connected to the outside of the disk array apparatus 1 and having a storage control function and inputting/outputting data to the DRV 30. The communication between the DKC 10 and the external disk controller 80 is established through the predetermined I/F. The external disk controller 80 may be a device having the same function as that of the disk array apparatus 1 or having different functions.

The network 70 is a SAN (Storage Area Network) configured by communication equipment such as one or more switches based on the FC protocol. In this case, a HBA (Host Bus Adapter) which is a communication I/F unit included in the host 50 and the CHA which is a communication I/F unit included in the disk array apparatus 1 have a communication processing function according to the FC protocol. In the case of using the FC protocol, the data to be transmitted/received is divided into one or more data blocks per predetermined data length, thereby being controlled in units of data block. A data I/O request (block access request) in units of block according to the FC protocol is transmitted from the host 50 to the disk array apparatus 1 and responded by the DKC 10.

The DKC 10 can employ a logical cluster configuration in order to ensure reliability. For example, a power unit, the DKC 10, and the DKC 300 may be configured as a dual cluster. A configuration having clusters (CL) #1 and #2, including the DKC with the same function, is set. If one cluster becomes down due to a failure, the other cluster continues to operate, so that service can be continuously provided.

The host 50 is an information processing device, which comprises a CPU, a memory, and a communication I/F unit (host bus adapter) and is formed of such as a PC, a workstation, a server, and a mainframe computer. Multiple programs on the memory are executed by the CPU, so that various functions as a host can be achieved. The host 50 includes a control program for inputting/outputting data to the disk array apparatus 1 and an application program for providing an information processing service utilizing the disk array apparatus 1.

The SVP 196 is an information processing device having a processor for maintaining and controlling the disk array apparatus 1 and built in or externally connected to the disk array apparatus 1. The SVP 196 is internally connected to the DKC 10 through the LAN 190 in the present embodiment. The SVP manages configuration information, fault information, and management information of the disk array apparatus 1. By the operator's operation of the SVP 196, a physical disk configuration and/or a LU (logical unit) of the DKU 300 can be set and programs executed on the CHA can be installed. The SVP 196 may be in the form exclusively used for maintenance and control or in the form of having no maintenance/control function on a general computer. The SVP comprises a CPU, a memory, a port, an input unit such as a keyboard, an output unit such as a display, a storage unit such as a HDD, and a recording medium reader such as a FD drive, for example. The CPU entirely controls and executes the programs on the memory, so that the control including the maintenance/management function according to the present invention is provided. The programs and various pieces of information used for the control according to the present invention are stored in the memory and the storage unit. The port is connected to the LAN 190. The operator operates using the input unit, the output unit and the recording medium reader. The worker for maintenance can operate the SVP 196 to perform a processing for the maintenance/management of the control PK 100. The SVP 196 may be in the form of being communicatively connected to the external device through means of communication. A maintenance/management unit other than the SVP 196 may be in the form of being communicatively connected externally. The host 50 for executing the maintenance/management program may be used as a maintenance/management unit.

<DKC>

The DKC 10 includes a mix PK 100, a GCM (global cache memory) 130, a DSW (data path control switch) 151, a PN (processor interconnection network) 152, and an internal LAN 190. The mix PK 100 has a characteristic function depending on the CHA, the DKA, and a combination of other PKs. The CHA is an I/F unit for the external device including the host 50 and the external disk controller 80. The DKA is an I/F unit for the storage unit including the DRV 30. The GCM 130 is a global cache memory shared with each PK in the DKC 10. The DSW 151 is a connection network for global data transfer between the PKs including a data transfer to the GCM 130 in the DKC 10 and is in the form of a high speed switch specifically. The PN 152 is a global interconnection network for communicate between the processors of the PKs in the DKC 10.

The mix PK 100 corresponding to a control PK is composed of a combination of a base PK 101 and a functional PK 102. The base PK 101 is a primary hierarchical PK connected to the DKC 10 and can connect a plurality of functional PKs 102. The functional PK 102 is a secondary hierarchical PK connected to the base PK 101 and serves as separated functions. Each functional PK 102 may be connected or not, and connection types may be freely selected. The functional PK 102 is connected according to the system and the request of users and has scalability in the system of the disk array apparatus 1.

The base PK 101 includes an LN (intra-PK interconnection network) 103. The LN 103 is a local connection network which can communicates including data transfer and inter-processor communication. In FIG. 2, one base PK 101 is configured so as to have a capacity capable of connecting the four functional PKs 102. The base PK 101 may include a processor therein or not. The base PKs in the mix PKs #1 and #3 (100) include the MPs, for example.

An I/F-PK 210, a LCM-PK 215 and a MP-PK 216 are provided as the functional PK 102. The functional PK 102 serving as an I/F with the outside of the DKC 10 is particularly referred to as the I/F-PK 210. The LCM-PK 215 is a memory PK. The MP-PK 216 is a processor PK. The I/F-PKs #1 to #4 (210) are connected in the mix PK #1 (100) in FIG. 2. The I/F-PK #1 (210) is connected to the host 50. The I/F-PKs #2 and #3 (210) are connected to the network 70. The I/F-PK #4 (210) is connected to the external disk controller 80. The I/F-PKs #5 and #6 (210), the LCM-PK 215, and a MP-PK 216 are connected in the mix PK #2 (100). The I/F-PKs #11 and #12 (210) are connected and the remaining two are not used. The I/F-PKs #11 and #12 (210) are connected to the DKU 300. Each of the I/F-PKs #1 and #12 (210) may be the same kind of I/F or different kinds of I/F. For example, the I/F-PKs #1 to #4 are different kinds of I/Fs in the mix PK #1 (100).

A D path (data path) for connecting the DSW 151 to each LN 103 and the GCM 130 is set and used for transferring data. A P path (processor path) for connecting the PN 152 to each LN 103 is set and used for communication between the processors. Note that the term "global" means use for the inter-PK communication in the DKC 10, and the term "local" means use for the intra-PK communication.

The mix PK 100 (e.g. #1) including the functional PK 102 connected to the host 50 and the external disk controller 80 mainly serves as the CHA in FIG. 2. The mix PK 100 (e.g. #4) including the functional PK 102 connected to the DRV 30 mainly serves as the DKA.

<Conventional Configuration>

FIG. 19 shows a configuration example of a DKC in a conventional disk array apparatus, especially, represents a connection configuration and a data-transfer operation with the external disk controller 80. In the disk array apparatus 901, the DKC 910 is configured by connecting the control PKs such as a CHA-PK 911 for executing the I/F control with the host 50, a DKA-PK 912 for executing the I/F control with the DRV 30, a CM-PK 913 serving as a CM for caching data, and a CSW (cache switch)-PK 914 serving as a connection network for controlling the data transfer. The CHA-PK 911 includes a first CHA corresponding to an ESCON-I/F and a second CHA corresponding to a fiber I/F.

The conventional DKC 910 is configured to have processors (MP) 920 and 923 per function such as the CHA and the DKA, thereby controlling the transfer path. The transfer path is a logical path set on a physical bus line between the units. Only one kind of I/F determined for each control PK (the CHA-PK 911 and the DKA-PK 912) is supported in the conventional DKC. Therefore, when it is necessary to connect to the different kind of I/F, another control PK corresponding to the pertinent I/F is additionally provided in order to provide a port for the different kind of I/F. Thereby, the number of ports and that of processors are increased more than necessary at a time of configuring the disk array apparatus, for example, of the minimum configuration thereof. Thus, it is difficult to provide the DKC configuration satisfying the user's request completely or in detail. The processor of the transfer path which is not connected/used cannot be effectively utilized, that is, the load cannot be distributed using the above-mentioned processor. Additionally, when data is transferred between the different kinds of I/Fs, for example, if data is transferred at a time of the external connection, the common connection network (equivalent to the CSW-PK 914) in the DKC 910 must be used for transfer between the control PKs, so that the transfer performance is not improved and the other data transfer is affected due to use of the common connection network, whereby the system performance is affected.

Additionally, in the conventional configuration, as for the communication between the processors (MPs 920), information is exchanged by accessing the memory using the access path to a predetermined shared memory in the DMA transfer. Directory information on the data input/output is stored in the shared memory. The processor determines the presence or absence and the position of the request data in the command received from the host 50. The MP 920 instructs any DTA 921 to obtain a position of the request data, makes the DTA 921 confirm the information of the shared memory, and determines the position of the request data in the CHA, for example.

Two CHAs and two DKAs, each of which has a dual port, are provided in FIG. 19. The CHA-PK 911 includes a multiple port unit, the MPs 920, and the DTAs (data transfer control units) 921. The port unit establishes a communication processing corresponding to the I/F with the host 50. The MP 920 executes the control as the CHA. The DTA 921 is a circuit for performing the DMA-data transfer processing through the CSW-PK 914.

The DKA-PK 912 includes a multiple port unit, the MPs 923, and the DTAs (data transfer control units) 924. The port unit establishes the communication processing with the DRV 30 according to the I/F. The MP 923 executes the control as the DKA. The DTA 924 is a circuit for performing the DMA-data transfer processing through the CSW-PK 914. The DRV 30 is connected to the DKA through, for example, two paths.

The CM-PK 913 includes CMAs (cache memory adapters) 926 and memories 927. The CMA 926 is a circuit connected to the CSW-PK 914 and controlling the memory 927. The CSW-PK 914 is a switch for controlling the data transfer with respect to the cache memory. The CSW-PK 914 has CARBs (cache arbiters) 928 for arbitrating the transfer path.

The host 50 is connected to one of the CHA-PKs 911 through the ESCON-I/F and inputs/outputs the data to the DRV 30. The external disk controller 80 is connected to the other of the CHA-PKs 911 through the fiber I/F and inputs/outputs the data to the DRV 30.

An example of the data transfer processing in the DKC 910 will be as follows. The operation indicated as "a1" is a data transfer from the host 50 to the CM in FIG. 19. The first CHA receives the data from the host 50 through the processing by the port unit. The first CHA writes the data into the memory 927 in the CM-PK 913 through the CSW. The operation indicated as "a2" is a data transfer from the CM to the host 50. The first CHA reads the data from the memory 927 in the CM-PK 913 through the CSW. The first CHA transfers the read data to the host 50 through the processing by the port unit. The host 50 receives the data from the first CHA. The operation indicated as "a3" is a data transfer from the CM to the DRV 30 connected to the DKA. The DKA reads the data from the memory 927 in the CM-PK 913 through the CSW. The DKA transfers the read data to the DRV 30 through the processing by the port unit. The DRV 30 writes the received data into a disk area. The operation indicated as "a4" is a data transfer from the DRV 30 connected to the DKA to the CM. The DKA receives the data read from the DRV 30 through the processing by the port unit. The DKA writes the data into the memory 927 in the CM-PK 913 through the CSW.

The operation indicated as "a5" is a data transfer from the CM to the DRV 30 connected to the external disk controller 80. The second CHA reads data from the memory 927 in the CM-PK 913 through the CSW and transmits the data to the external disk controller 80 through the processing by the port unit. Then the data is written from the external disk controller 80 to the DRV 30. The operation indicated as "a6" is a data transfer from the DRV 30 connected to the external disk controller 80 to the CM. Firstly, data is read from the DRV 30 to the external disk controller 80. Next, the second CHA receives the data from the external disk controller 80 through the processing by the port unit and writes the data into the memory 927 in the CM-PK 913 through the CSW.

In the CHA-PK 911 and the DKA-PK 912, the DTAs 912 and 914 perform the DMA-data transfer processing to the CM-PK 913 through each of the above-described operations under the control of the MPs 920 and 923, respectively. Additionally, in the CSW-PK 914, the CARB 928 reads/writes the data to/from the memory 927 through the CMA 926 in the CM-PK 913.

When data is written from the host 50 to the DRV 30 in the disk array apparatus 901, for example, the operations "a1" and "a3" are sequentially performed. When data is read from the host 50 to the DRV 30 in the disk array apparatus 901, the operations "a4" and "a2" are sequentially performed. When data is transferred from the host 50 to the external disk controller 80, the operations "a1" and "a5" are sequentially performed. When data is transferred from the external disk controller 80 to the host 50, the operations "a6" and "a2" are sequentially performed.

In the conventional configuration, when data is transferred between the different kinds of I/Fs, the CHA-PK 911 for each I/F is required and the transfer processing between the CHA-PKs 911 must be performed. Taking the present embodiment as an example, when data is transferred between the host 50 through the ESCON-I/F and the external disk controller 80 through the fiber I/F, it is necessary to perform the transfer processing between the first CHA-PK 911 and the second CHA-PK 911 through the CSW-PK 914 and the CM-PK 913.

Note that if each PK corresponding to one kind of I/F port is prepared and interconnected in the DKC according to need, there is the drawback that connection and/or wiring for the memory or switch executing the data transfer to the memory becomes complicated and large capacity. Therefore, the conventional technology has provided the DKC in which a plurality of same kind of I/F ports are integrated in one board/PK.

<Base PK>

Figure 3A:
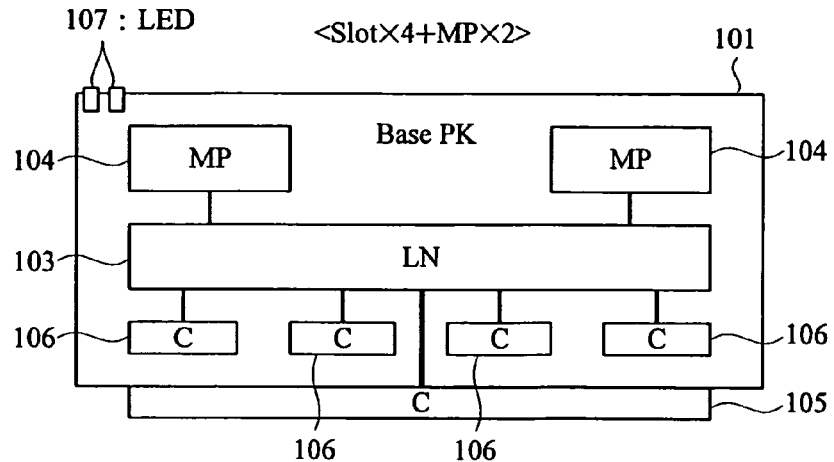
FIG. 3A is a diagram showing a configuration example of a base PK in the disk array apparatus according to the embodiment of the present invention.
Figure 3B:
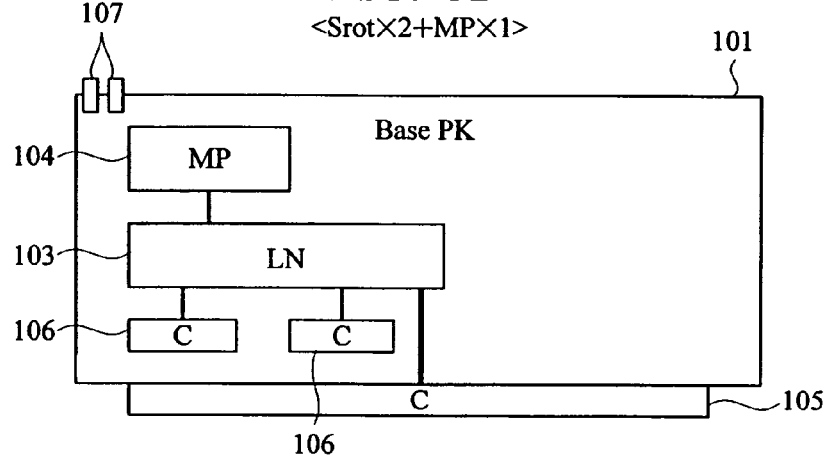
FIG. 3B is a diagram showing a configuration example of a base PK in the disk array apparatus according to the embodiment of the present invention.
Figure 3C:
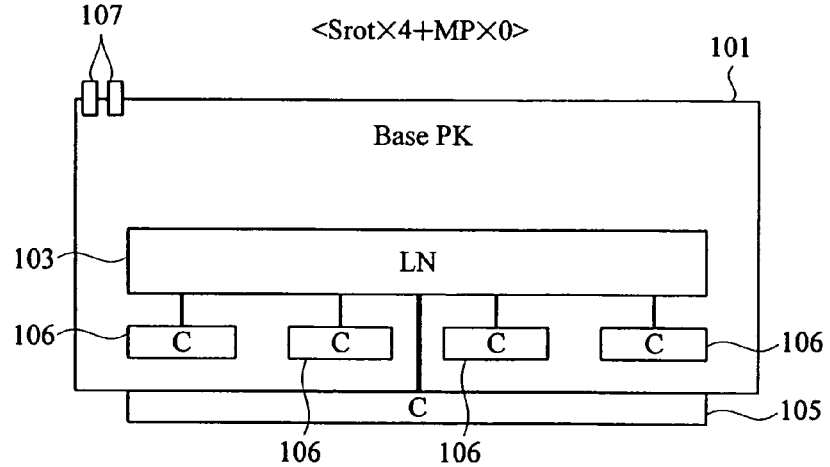
FIG. 3C is a diagram showing a configuration example of a base PK in the disk array apparatus according to the embodiment of the present invention.

FIGS. 3A to 3C represent configuration examples of the base PK 101. FIG. 3A shows an example of having four slots capable of inserting/drawing the functional PK and two processors, FIG. 3B shows an example of having two slots and one processor, and FIG. 3C shows an example of having four slots but no processor. The number of connectors 106 and that of equipped MPs 104 are not limited to the present embodiment and they may be arbitrarily selected. Note that the connector is indicated as "C" in each Figure.

The base PK 101 comprises a LN 103, MPs 104, a connector 105 connected to a BP board 90, a plurality of connectors 106 for connecting the functional PK, and a LED (light emitting diode) 107 for maintenance in FIG. 3A. The LN 103 includes an interconnection network for data transfer and an interconnection network for control by the processor. The LN 103 connects the MP 104, the connector 105, and each connector 106. The functional PK 102 connected to each connector 106 is communicatively connected in the LN 103 internally. The LN 103 is connected to the DSW 151 and the PN 152 through the connector 105 and the BP board 90 and can communicate with some external other PKs and/or processing units. The MPs 104 serve as various control processors in the DKC 10. The MP 104 can control not only each functional PK 102 in the mix PK 100 on which the MP itself is mounted, but also the other PKs through the PN 152. The connector 105 is connected to a connector (91) of the BP board 90. The connector 106 is connected to a connector (214) of the functional PK 102. When the base PK 101 and the functional PK 102 are connected, the plurality of connectors 106 of the base PK 101 are standardized in the form capable of being connected to the different kinds of functional PKs 102. The LED 107 is an indicator for displaying maintenance/management of the PK. The indication of the LED 107 is controlled from inside and outside of the base PK 101. It is indicated that the base PK 101 is an object for replacement and/or maintenance by the indication of the LED 107. The LED 107 may be provided so as to correspond to the slot for connecting each functional PK 102 and to indicate a state of each functional PK 102.

FIGS. 3B and 3C represent examples reduced in size and have the same mechanism as that of FIG. 3A. Each base PK 101 has a configuration adapted to a hot-swap configuration with a junction of the DKC box 194 and the BP board 90. Each of the base PKs 101 of FIGS. 3A and 3C has a capacity capable of connecting at most four functional PKs 102. The base PK 101 of FIG. 3B has a capacity half as much as that of FIG. 3A. The base PK of FIG. 3C does not have the MP 104, but it is controlled by any processor included in the other units.

<Functional PK and I/F-PK>

Figure 4A:
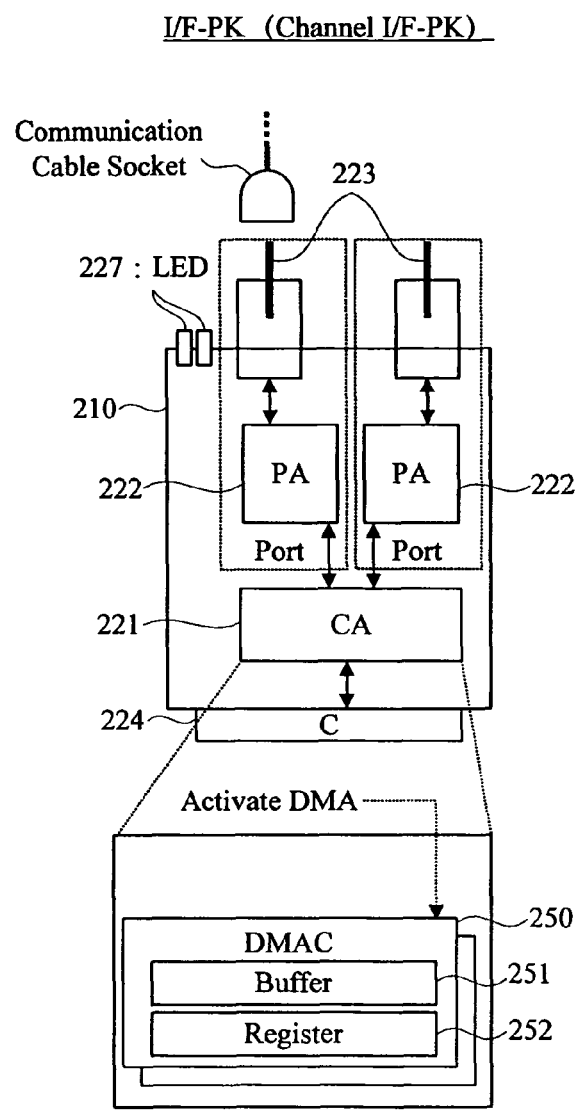
FIG. 4A is a diagram showing a configuration example of a functional PK in the disk array apparatus according to the embodiment of the present invention.
Figure 4B:
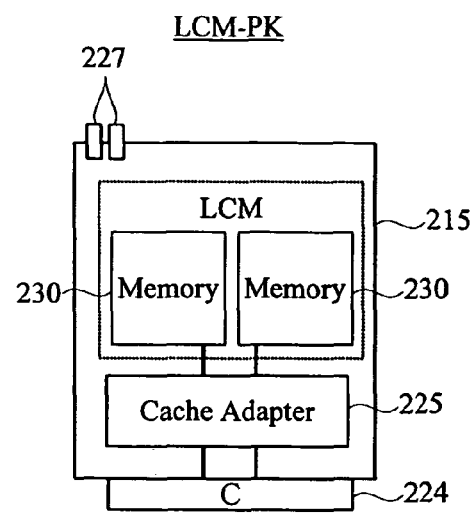
FIG. 4B is a diagram showing a configuration example of a functional PK in the disk array apparatus according to the embodiment of the present invention.
Figure 4C:
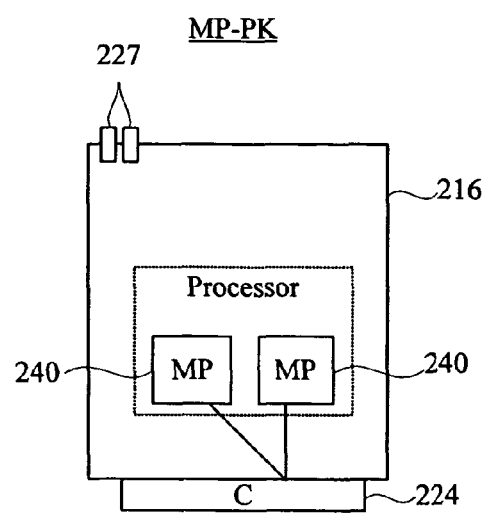
FIG. 4C is a diagram showing a configuration example of a functional PK in the disk array apparatus according to the embodiment of the present invention.

FIGS. 4A to 4C represent configuration examples of the functional PK 102. FIG. 4A shows a channel I/F-PK serving as the I/F-PK 210, FIG. 4B shows an LCM/PK 215 that is the memory PK, and FIG. 4C shows an MP/PK 216 that is the processor PK.

As the I/F-PK 210 in FIG. 4A, the PK corresponding to the channel I/F controlled with the host 50 is referred to as a channel I/F-PK. The I/F-PK 210 is a port PK including one or more specified I/F ports in other words. Similarly thereto, the PK corresponding to the drive I/F is referred to as a drive-I/F PK. The I/F-PK 210 includes an adapter-type one such as a channel adapter (CA) 221 for performing the I/F control, a protocol adapter (PA) 222 corresponding to the I/F, a connector 223 connected to the port, a connector 224 connected to the base PK, and a LED 227 for maintenance. The connector 223 and the PA 222 are connected, the PA 222 and the CA 221 are connected, and the CA 221 and the connector 224 are connected.

The channel I/F-PK (210) in the present embodiment has two ports (I/F ports) corresponding to the specified I/F. The port includes the PA 222 and the connector 223. The PA 222 performs a communication protocol treatment with the external device corresponding to the I/F. A communication cable socket for s physical link to the outside is connected to the connector 223. The port is managed by the DKC 10 and the SVP 196 as information.

The CA 221 is a circuit controlled as the channel I/F in the pertinent PK and has a port control function and a DMA-data transfer processing function. The CA 221 includes one or more DMACs (DMA control circuit) 250. The DMAC 250 is controlled by any of the MPs in the DKC 10 and performs the DMA-data transfer processing responsive to an activation of the DMA. The DMAC 250 includes a buffer 251 to be a region for buffering the transferred data and a register 252 to be a region for storing the data-transfer information. The data-transfer information is various pieces of control information such as a transfer-source address and a transfer-destination addresses and a data volume for controlling the DMA-data transfer processing, and set by the MP etc. In the DMA-data transfer processing, the DMAC 250 performs the data transfer processing in the buffer 251 while buffering the transferred data according to the data transfer information in the register 252.

The LED 227 is an indicator for displaying data pertinent to the PK maintenance/management. The indication of the LED 227 is controlled from inside and outside of the base PK 101. It is indicated that the base PK is an object for replacement and maintenance by the indication of the LED 227. The drive I/F-PK has the same configuration as that of the channel I/F-PK and has a drive adapter instead of the CA 221.

The LCM-PK 215 comprises a cache adapter 225, a memory 230, a connector 224, and a LED 227 in FIG. 4B. The cache adapter 225 is a memory control circuit for data control and read/write control to/from the memory 230, and is controlled with the data transfer as a data cache and the MP. The memory 230 serves as an LCM in the DKC 101. The number of memories to be equipped therewith can be arbitrarily selected. The LCM is in local relationship with the GCM 130 and used from inside and outside of the mix PK 100.

The MP-PK 216 comprises MPs 240, a connector 224, and LEDs 227 in FIG. 4C. The MP 240 serves as a processor for controlling the inside and outside of the mix PK 100. The number of MPs to be equipped therewith can be arbitrarily selected. The MP can control not only the inside of the own PK but also the inter-PK through the LN 103 in the base PK 101.

Each functional PK 102 is provided with an ID to indicate a type of PK/board. The ID is read by the DKC 10 and used for the PK maintenance/management. Each functional PK 102 has a configuration adapted to a hot-swap configuration with a junction of base PK 101 through the connector 224. The adapter of each functional PK 102 is connected to the LN 103 through the connector 224. The communication between the functional PKs 102 can be established through the LN 103. I/Fs applicable to the functional PK 102 are a SCSI (Small Computer System Interface), a FICON, a ESCON, a ACON-ARC (Advanced Connection Architecture)(registered trademark), a FIBARC (Fibre Connection Architecture) (registered trademark), a TCP/IP (Transmission Control Protocol/Internet Protocol) (registered trademark), and so forth. Additionally, the base PK 101 and the functional PK 102 may have a package holding structure such as a clasp and a simple ejection structure such as a button, as an additional electrical/mechanical structure.

<Mix PK>

Figure 5:
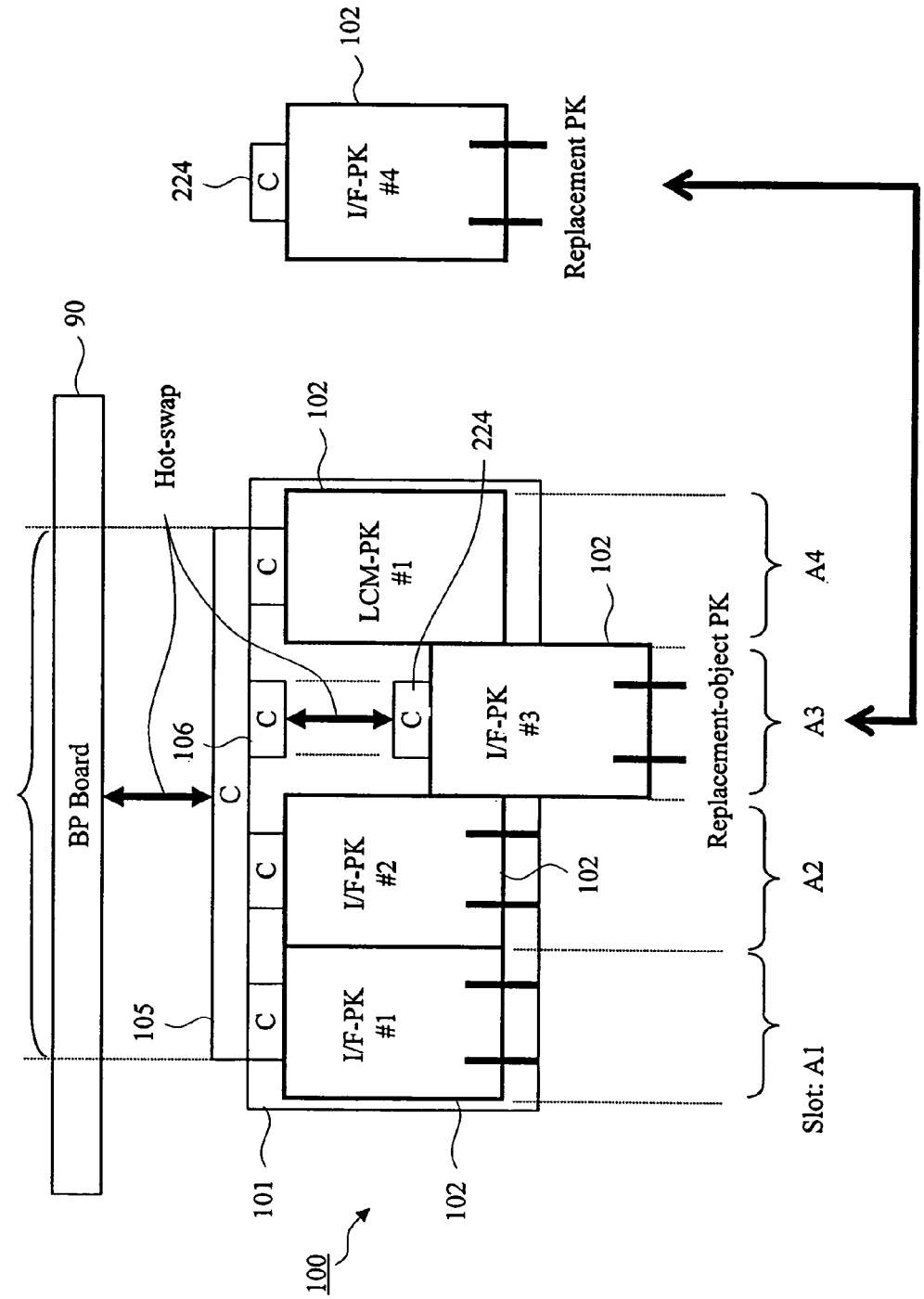
FIG. 5 is an explanatory view for showing both of a configuration example of a mix PK and insertion/draw of the PK in the disk array apparatus according to the embodiment of the present invention.

FIG. 5 shows a configuration example of the mix PK 100 and of inserting/drawing the PK. The mix PK 100 is configured by a combination of the base PK 101 of FIG. 3 and the functional PKs 102 of FIG. 4. The connector 105 of the base PK 101 is connected to the connector (91) of the BP board 90. The base PK 101 is hot-swapped with a slot A in the DKC box 194, for example. The connector 224 of the functional PK 102 is connected to the connector 106 of the base PK 101. The present embodiment shows the case where the functional PKs 102 are hot-swapped with the slots A1 to A4 provided in the base PK 101, respectively, for example. The base PK 101 is connected to the BP board 90 and the I/F-PKs #1, #2 and #3 (210) and the LCM-PK #1 (215) are connected to the slots A1 to A4, respectively. Also, the present embodiment shows the case where the I/F-PK #3 (210) becomes an object for replacement due to a change of the functional configuration of the mix PK 100 and/or occurrence of failure of the functional PK 102 and is replaced with a substitutive I/F-PK #4 (210). The maintenance worker draws out the replacement-object I/F-PK #3 (210) from the base PK 101 and inserts the substitutive I/F-PK #4 (210) into the drawn-out position in an operation of the disk array apparatus 1. At this time, the LED 227 of the I/F-PK #3 (210) is lighted up by the control of the SVP 196, whereby it is indicated to the maintenance worker that the I/F-PK #3 (210) is the replacement object. Information of each of the slots A and A1 to A4 and a PK-connecting state at its position is managed as the configuration information and the state information in the SVP 196 and/or the DKC 10 and is updated depending on the insertion/draw of the PK. For example, the information indicating that the base PK 101 is connected to the slot A and the I/F-PK #4 is connected to the slot 3 on the base PK 101 is recorded as the configuration information.

The combination and the number of functional PKs 102 connected to the base PK 101 depend on the form of configuring the disk array apparatus adapted to the service provided for each user, whereby they can be freely selected in the capacity. Thus, the number of I/F ports for the same mix PK 100 can be freely added and subtracted, so that the different kinds of I/Fs can coexist with each other in the same mix PK 100, whereby the configuration and the performance thereof can be minutely changed. Therefore, it is unnecessary to transfer the data between the control PKs through the common connection network in the conventional DKC by using the above-mentioned combination, and the data transfer processing can be performed in the same mix PK 100, so that the data transfer processing can be speeded up. Additionally, by the increase or decrease of the functional PK and/or the miniaturization of the transfer path, an influence on the system reliability also becomes reduced and such a advantage is apparently obtained even at the time of occurrence of power failure. Especially, since the I/F-PK 210 is adapted to have the hot-swap configuration, the maintenance/replacement and the configuration change of the increase and/or decrease per I/O port during the operation of the disk array apparatus 1 can be achieved.

<DKC Box and Insertion/Draw of PK>

Figure 6A:
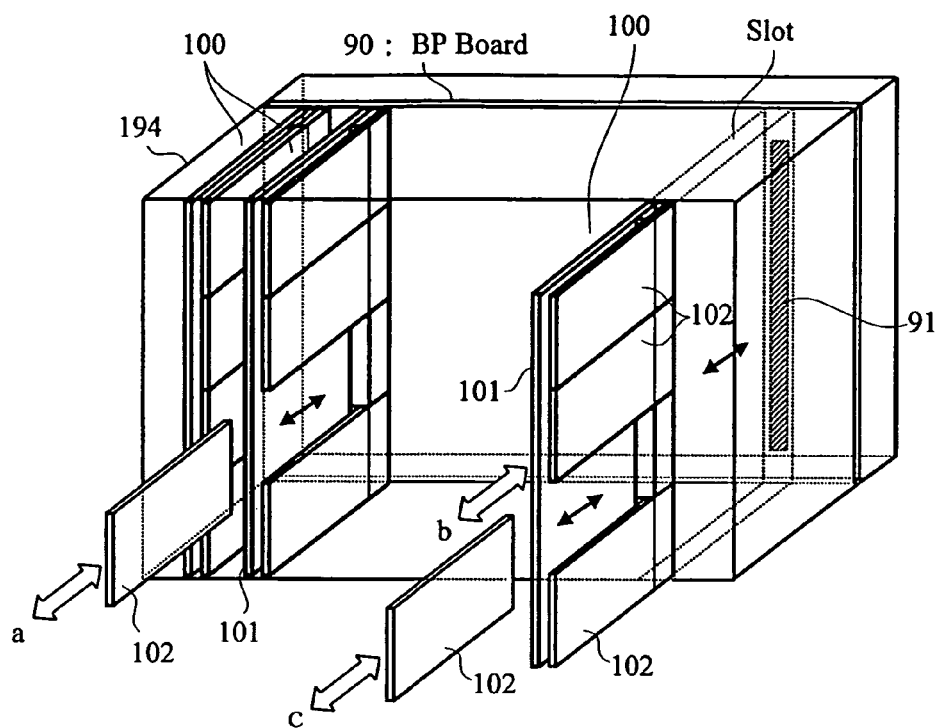
FIG. 6A is a diagram showing a configuration of PK attachment/detachment in a DKC box, as a configuration example of PK connection, in the disk array apparatus according to the embodiment of the present invention.
Figure 6B:
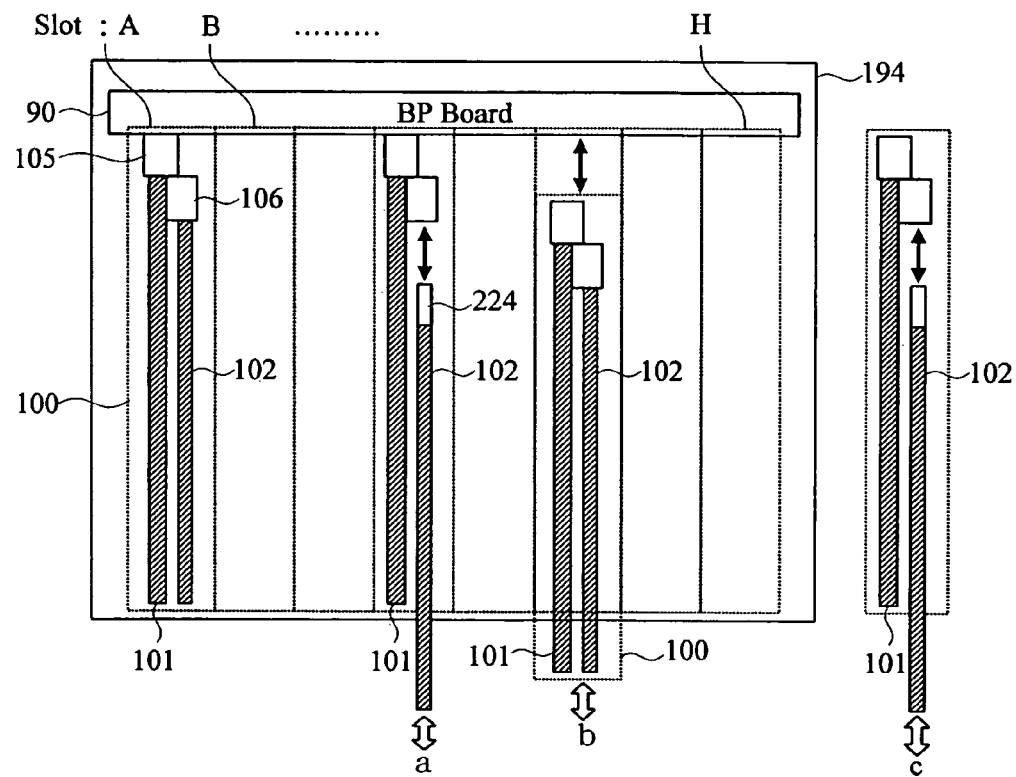
FIG. 6B is a diagram showing a configuration of PK attachment/detachment in a DKC box, as a configuration example of PK connection, in the disk array apparatus according to the embodiment of the present invention.

FIGS. 6A and 6B shows a configuration for mounting/detaching the PK on/from the DKC box 194, as a configuration example of connecting the PK to the disk array apparatus 1. FIG. 6A is a perspective view showing three operations "a" to "c" of inserting/drawing the PK into/from an opening provided on a front face of the DKC box 194. FIG. 6B is a cross-sectional view showing the same operations "a" to "c" as those of FIG. 6A and viewed from an upper side of the DKC box 194. Note that the external and junction configurations of the PK are simplified. The base PK 101 and the functional PK 102 have independent configuration capable of hot-swap, respectively.

The control PKs 100 are inserted/drawn into/from slots of the DKC box 194 in the form of the mix PKs 100, as shown in FIG. 6A. The DKC box 194 has a surface of the BP board 90 on its back side. The surface of the BP board 90 is provided with connectors 91 corresponding to a plurality of slots for connecting the base PKs 101. Note that a rear face side of the DKC box 194 may have the same structure as described above. All of the PKs constituting the DKC 10 are connected to the BP board 90 through a predetermined junction structure including the connector.

The base PK 101 and the functional PK 102 can be inserted/drawn, as shown by the operations "a" to "c", by the maintenance worker. The operation "a" represents a hot-swap state of the functional PK 102 with respect to the base PK 101/mix PK 100 having been inserted to the slot of the DKC box 194. The operation "b" represents a hot-swap state of the base PK 101/mix PK 100 with respect to the slot of the DKC box 194. The operation "c" represents a hot-swap state of the functional PK 102 with respect to the base PK 101/mix PK 100 which is not inserted into the slot of the DKC box 194.

FIG. 6B shows the case where the DKC box 194 has eight slots "A" to "H" into which the mix PK 100 can be inserted. The mix PK 100 and the base PK 101 can be freely inserted/drawn into/from each slot. In this embodiment, the mix PK 100 and the base PK 101 are inserted/drawn into/from the slot in the same direction. The DKC box 194 and each PK have the mechanical structures adapted to the form of capable of inserting/drawing the PK, respectively. The base PK 101 is inserted or drawn along the guide rail provided in the slot of the DKC box 194. The inserted PK is fixed to and held in the slot through the predetermined mechanical structure.

Note that the structure of hierarchically inserting/drawing the PK/board is not limited to the present embodiment and may be in the form other than that of the embodiment. For example, the above other form may include the form of inserting/drawing the functional PK between two boards constituting the base PK, the form of mounting/detaching the functional PK vertically to each surface of boards constituting the base PK, and the like.

The maintainability in operation is important for the disk array apparatus. Therefore, both of the base PK 101 and the functional PK 102 are configured so as to correspond to the hot-swap structure in the present embodiment. The maintenance and replacement can be flexibly performed in units of I/F port due to the hot-swap structure.

<Configuration Example of Mix PK>

FIG. 7 shows a configuration example of the mix PK 100 when the mix PK 100 is incorporated in the DKC 10. The configuration example of the mix PK 100 includes an example of combining two kinds of channel I/F-PKs 210 (I/F-PKs #1 and #2), a LCM-PK 215, and a MP-PK 216 with respect to the base PK 101. The combination example is a configuration of corresponding to the different kinds of I/Fs and having the processing performance enlarged by the LCM and the MP in one mix PK 100. Also, the configuration of having two MPs 104 in the base PK 101 is shown.

The I/F-PK #1 (211) corresponds to ESCON as an I/F for the host 50. The I/F-PK #2 (212) corresponds to an FC as an I/F for the host 50. Each I/F-PK 210 transfers data to/from the base PK 101 and controls the MP through the connector 224.

The LN 103 includes a LDSW (local data path control switch) 108 as a LN for data, and a LPN (local processor interconnection network) 109 as a LN for the MP. The LDSW 108 is connected to the connector 223 of each functional PK 102 and the connector 105 for connecting the BP board, and is interconnected to the DSW 151. The LDSW 108 switches the data transfer path and determines whether it is connected in the PK or between the PKs. The switch structure is used as the connection network for data transfer (DSW 151 and LDSW) in the present embodiment. However, a structure in which respective units can be interconnected may be applied and, for example, a bus type connection and a direct connection may be applied.

Similarly thereto, the LPN 109 is connected to the connector 223 of each functional PK 102 and the connector 105 for connecting the BP board, and is interconnected to the PN 152. The LPN 109 is used for communication control by the processors inside and outside the PK, and switches the control path. The processors employing the LPN 109 and the PN 152 are the MP 104 in the base PK 101, the MP in the functional PK 102 such as the MP-PK 216, and the MP of the other processing unit in the DKC 10.

As another configuration example of the mix PK 100, the MP-PK 216 of FIG. 7 is replaced with the I/F-PK #3 (213) corresponding to the drive I/F, so that the present invention can adopt a configuration of mixing the channel I/F and the drive I/F. That is, the mix configuration is a configuration of combining two kinds of channel I/, the LCM-PK 215, and one kind of drive I/F-PK (213). The I/F-PK #3 (213) corresponds to, for example, an SCSI/I-F and connects the DRV 30 to the connector 223 through a connection line to serve as the DKA. A drive adapter (DA) for controlling the drive I/F is connected to the LN 103. Thereby, data can be transferred between the inside of the mix PK 100 and the host 50 and between the inside of the mix PK 100 and the DRV 30 as the data is cached in the LCM.

The LCM installed in the LCM-PK 215 can be freely utilized. In a first utilization example, local data in one mix PK 100 is stored in the LCM and used as a data cache. Each I/F-PK 210 and the MP store the data in the LCM. In a second utilization example, shared data such as the control information for communication between the MPs is stored in the LCM 230, that is, the LCM 230 is used as a shared memory. A portion of the LCM and the GCM 130 can be used as the shared memory. In a third utilization example, data can be transferred between the LCM and the GCM 130 by an instruction of the MP. The data can be transferred between the LCM and the GCM 130 without using the adapter such as the CA 221 of the I/F-PK 210. For example, data is transferred between the LCM 230 of the LCM-PK 215 and the GCM 130 by the control of the MPs 104 in the base PK 101.

<Configuration Example of DKC (1)>

Figure 8:
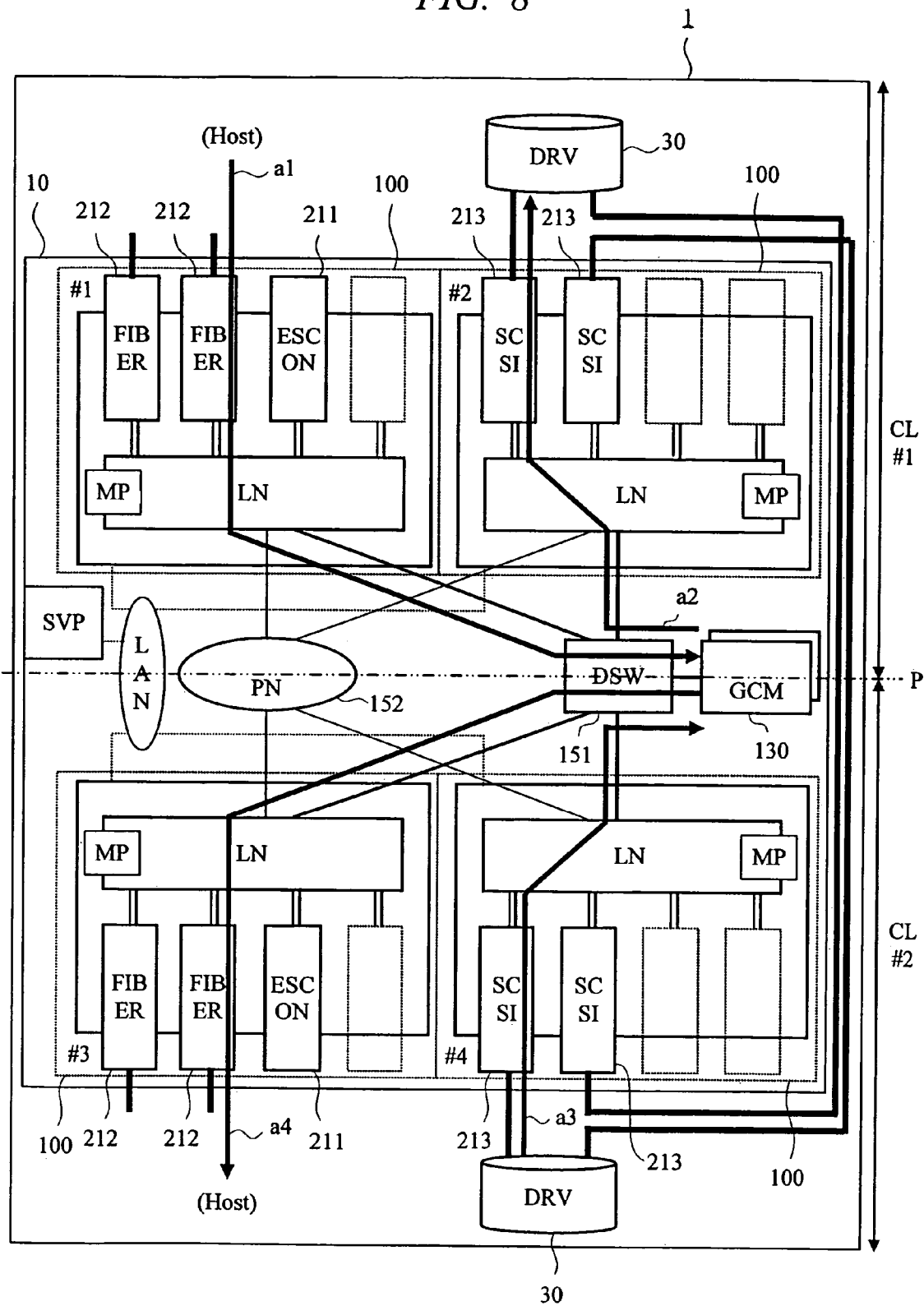
FIG. 8 is a block diagram showing a first configuration example of the DKC by a PK combination and an operational example of data transfer in the disk array apparatus according to the embodiment of the present invention.

FIG. 8 shows a first configuration example of the DKC 10 obtained by combining the PKs and an operational example of data transfer. The configuration shown in the present embodiment is the case where the channel control and the drive control are separated in units of the mix PK 100 similarly to a conventional configuration of the control PK. The above configuration can be manufactured at low cost since it can be configured only by the necessary ports and the functional PKs for the DRV 30.

A CL #1 and a CL #2 are configured above and below a power boundary except for the SVP 196 in FIG. 8. The CL #1 includes first and second mix PKs #1 and #2 (100), and the CL #2 includes third and fourth mix PKs #3 and #4 (100). The channel I/F and the drive I/F are symmetrically connected as the separate mix PKs 100 in the CL #1 and CL #2.

Figure 9:
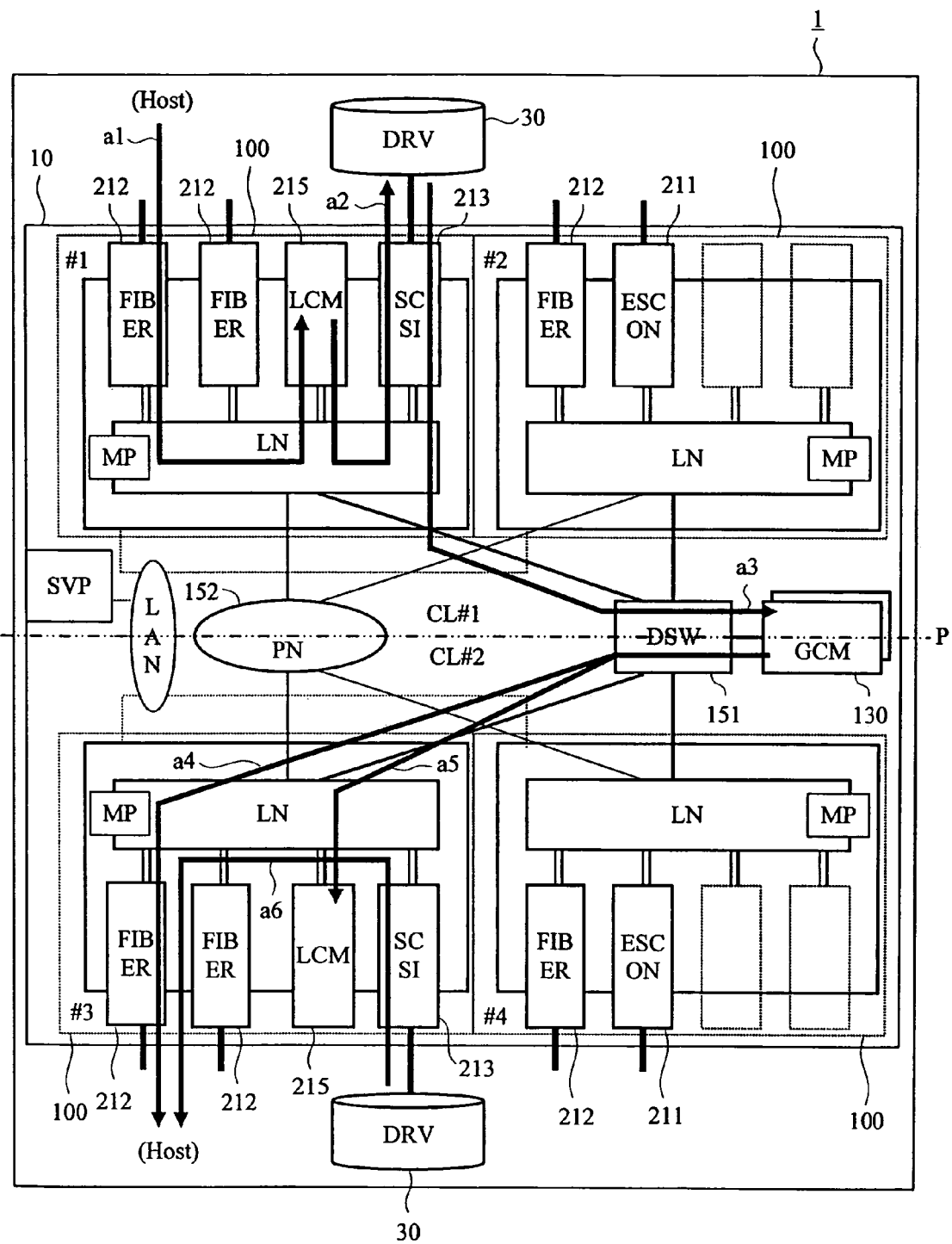
FIG. 9 is a block diagram showing a second configuration example of the DKC by the PK combination and an operational example of the data transfer in the disk array apparatus according to the embodiment of the present invention.

In order to improve the reliability, the disk array apparatus has the configuration of having, for example, the power boundary for each cluster, so that it becomes necessary to prevent the system down at a time of occurrence of some failures. Therefore, in the present embodiment, as shown in FIGS. 8 and 9, the PKs can be combined and connected to an external device and the DRV 30 depending on a cluster configuration including the DKC 10.

The mix PK #1 (100) as a channel I/F connects two fiber I/F-PKs 212 and one ESCON-I/F-PK 211 and one I/F-PK is not used. The mix PK #2 (100) as a drive I/F connects two SCSI-I/F-PKs 213 and two I/F-PKs are not used. The DRV 30 of the CL #1 is connected to one of the SCSI-I/F-PKs 213 and the DRV 30 of the CL #2 is connected to the other of the SCSI-I/F-PKs 213 so as to correspond to the cluster configuration. Each base PK 101 has the MP 104.

In a first configuration example, an operation a1 represents a flow of the data write from the host 50 to the GCM 130. An operation a2 represents a flow of the data write to the GCM 130 to the DRV 30. An operation a3 represents a flow of the data read from the DRV 30 to the GCM 130. An operation a4 represents a flow of the data read from GCM 130 to the host 50.

For example, in response to a request for writing data to the DRV 30 from the host 50, firstly, the second fiber I/F-PK 212 writes the write data from the host 50 to an area of the GCM 130 and returns, to the host 50, a response to completion of the data write in accordance with the control by the processor in the CL #1, for example, by the MP 104 in the mix PK #1 (100), by using the operation a1. Next, the first SCSI-I/F-PK 213 reads the write data from the GCM 130 and writes the data into the area of the pertinent DRV 30 in accordance with the control by the MP in the mix PK #2 (100) of the CL #1, by using the operation a2.

Further, in response to the request for reading the data from the DRV 30 from the host 50, firstly, the second fiber I/F-PK 212 issues the data read request to the mix PK #4 (100) of the CL #2 in accordance with the control by the processor in the CL #2, for example, by the MP 104 in the mix PK #3 (100). Next, the first SCSI-IF-PK 213 reads the requested read data from the area of the pertinent DRV 30 and writes the data into an area of the GCM 130 in accordance with the control by the MP in the mix PK #4 (100) of the CL #2, by using the operation a3. Then, the second fiber I/F-PK 213 reads the read data from the GCM 130 and transmits the data to the host 50 in accordance with the control by the MP in the mix PK #3 (100) of the CL #2, by using the operation a4.

<Configuration Example of DKC (2)>

FIG. 9 shows a second configuration example of the DKC 10 obtained by combining the PKs and an operational example of the data transfer. The configuration example in this embodiment is the case where the channel control and the drive control coexist in the same mix PK 100. By using the above configuration example, since the data input/output processing can be performed between the host 50 and the DRV 30 in the same mix PK 100, the data transfer processing can be speeded up.

In FIG. 9, the CL #1 and CL #2 are configured above and below the power boundary denoted by the reference symbol "P". The mix PKs 100, in which the channel I/F, the drive I/F, and the LCM coexist, are symmetrically connected in the CLs #1 and #2, respectively.

The mix PK #1 (100) as a channel I/F connects two fiber I/F-PKs 212, the LCM-I/F-PK 215, and one SCSI-I/F-PK 213. The DRV 30 is connected to the SCSI-I/F-PK 213. The mix PK #2 (100) as a channel I/F connects one fiber I/F-PK 212 and one ESCON-I/F-PK 211, and two I/F-PKs are not used. Each base PK 101 has the MP 104.

In the second configuration example, an operation a1 represents a flow of the data write from the host 50 to the LCM in the mix PK #1 (100). An operation a2 represents a flow of the data write from the LCM in the mix PK #1 (100) to the DRV 30 connected to the same mix PK 100. An operation a3 represents a flow of the data read from the DRV 30 to the GCM 130. An operation a4 represents a flow of the data read from GCM 130 to the host 50. The operation a5 represents a flow of the data read for caching the data from the GCM 130 to the LCM. The operation a6 represents a flow of the data read from the DRV 30 to the host 50. Each operation, the reverse operation thereof, and the combination of their operations can be selectively performed depending on the situation.

In response to a request for writing data to the DRV 30 from the host 50, firstly, the first fiber I/F-PK 212 writes the write data from the host 50 to an area of the LCM and returns, to the host 50, a response to completion of the write data in accordance with the control by the processor in the CL #1, for example, by the MP 104 in the mix PK #1 (100), by using the operation a1. Next, the SCSI-I/F-PK 213 reads the write data from the LCM of the LCM-PK 215 and writes the data into the area of the pertinent DRV 30 in accordance with the control by the MP in the mix PK #1 (100), by using the operation a2.

Further, in response to the request for reading data from the DRV 30 from the host 50, firstly, the first fiber I/F-PK 212 reads the data from the area of the GCM 130 at a time of presence of the data in the GCM 130 and transmits the data to the host 50 in accordance with the control by the processor in the CM #2, for example, by the MP 104 in the mix PK #3 (100), by using the operation a4. The data being read from the GCM 130 is stored as the cache data in the area of the LCM of the LCM-PK 215, for example, by using the operation a5 in parallel with the operation a4. Alternatively, the data is cached from the GCM 130 to the LCM by using the operation a5, and then the data is transferred from the LCM to the host 50 by using a flow reverse to that of the operation a1. Additionally, if the requested data resides in the DRV 30, the data is read from the DRV 30 and stored as the cache data in the GCM 130 by using the operation a3 and then the operations a4 and a5 are performed in the same way. Alternatively, the data is transferred to the host 50 by using a flow reverse to those of the operations a2 and a1. Alternatively, the data is directly transferred from the DRV 30 to the host 50 by using the operation a6.

<Control Method>

Next, a control method of the DKC 10 will described with reference to FIGS. 2, 4 and 7. Particularly, if the DKC is connected to the outside, a processing flow of controlling the DKC is represented also in FIGS. 13 and 14. Hereinafter, a description will be made of a processing in which the host 50 reads the data from the DRV 30 of the disk array apparatus 1, by way of example. Firstly, commands from the hosts 50 are received at the PAs 222 in the ports of the I/F-PKs 210. The commands received at the PAs 222 are transmitted to the CA 221. Any of the MPs in the DKC 10 analyzes the received commands and determines the request data of the commands, that is, data-storage positions (address etc.) to be access destinations for read by using the CA 221. The command processing may be performed by any of the processors in the DKC 10. If the processing is performed by the MP 104 of the base PK 101 in the same mix PK 100 as that including the functional PK 102 having received the commands, for example, it can be efficiently performed. The CA 221 refers to directory information in accordance with the instructions from the MP and performs a processing for obtaining the storage positions. Consequently, it is determined where the request data is located in the LCM, the GCM 130, or the DRV 30.

If determining that the request data is located in the CM, i.e. the LCM or GCM 130, the MP transmits the necessary data transfer information including information on the storage position to the CA 221 to activate the DMA. By doing so, the activated DMAC 250 of the CA 221 performs the DMA-data transfer processing to the request data between the transfer-destination host 50 and the transfer-source CM while the buffer 251 is used in accordance with the data transfer information on the register 252. At this time, the DSW 151 and the LDSW 108 confirm the address of the request data and switches connection destinations between the respective units, thereby being connected to the pertinent CM.

When the request data resides in the LCM in the same mix PK 100, the MP connects, to the LDSW 108 through the CA 221, the data transfer information for transferring the request data and uses the LN 103 to transmits the commands to the cache adapter 225 and read the data from the memories 230. Then, the CA 221 receives the read data through the LN 103 and transmits it to the host 50 through the PA 222. When the request data reside not in the LCM but in the GCM 130, the MP connects, to the DSW 151 through the CA 221, the data transfer information for transferring the request data, and uses the LN 103 and the DSW 151 to read the data from the GCM 103. The read data is transmitted from the CA 221 to the host 50 in the same way.

When the request data does not reside in the LCM and GCM 130, the MP issues a request for reading the request data with respect to the PK connecting the DRV 30 in which the request data is stored. According to the request, the pertinent I/F-PK 210 controls the data being read from the DRV 30 so as to be stored in the CM, i.e. in the GCM 130 and the LCM. Thereby, a cache hit ratio can be improved. Then, the read data is similarly transmitted from the CA 221 to the host 50. Especially, when the data of the DRV 30 is stored in the LCM within the own mix PK 100, the data can be transferred using the LCM and further the high-speed access can be achieved without being connected to the outside of the mix PK 100.

<Maintenance/Management of PK>

The maintenance/management of the PK will be described. In the conventional configuration of the DKC, increase/decrease and maintenance of functions have been performed in units of the control PK. For example, even if one I/F port has been failed, it is necessary that the whole control PK including the failed port is replaced. For this reason, a lot of work on the maintenance is taken and the influence on the system is enlarged. In the present embodiment, the maintenance is performed in units of the base PK or functional PK, whereby the work associated with the maintenance and the influence on the system are reduced.

Additionally, by increasing the kind of PK to subdivide the unit of increase/decrease of the PK, there are various functional PKs. Since one kind I/F has been used for each control PK in the conventional configuration, it was unlikely to make some mistakes at a time of replacing the PK. However, in the present embodiment, since the functional PKs 102 can be freely replaced for the plurality of slots, means for identifying the kind of PK is provided, whereby the PK is prevented from being improperly connected. As the above-described means, ID (identification information) capable of identifying the kind of PK, the state of PK, and the maintenance object is provided to each PK. The processing unit in the DKC 10 and the SVP 196 performs a processing for management of the kind of PK, the state of PK, and the maintenance object.

For example, PK identification means is a configuration in which each PK (101 and 102) is provided with a PK ID, a serial PROM, and a LSI register. When the PK is inserted/drawn, the DKC 10 and the SVP 196 refer to the PK ID, and compare the information managed by the SVP 196 with the actually connected PK and its connecting position to check misconnections etc. The SVP 196 always manages, for example, the configuration information for indicating the proper PK position and the PK fault information. If the misconnection of the PK is detected by checking, the SVP notifies the maintenance worker of the check result.

Especially, in the configuration in which the base PK 101 and the functional PK 102 are provided with the LEDs 107 and 227 for maintenance, in order to perform the maintenance and replacement when any failures occur in the PK, the SVP 196 controls display of the LEDs 107 and 227 in conjunction with the maintenance operation and gives the maintenance worker easily understandable instructions of the maintenance operation. Therefore, the maintenance worker can check the replacement position of the PK, and the kind of PK, etc. thereby being able to prevent maintenance errors.

If the LEDs 107 and 227 are not lighted up due to power failure etc., the instructions from the SVP 196 are given by LED display control obtained by the processing of the SVP 196 and given by GUI display in the display screen of the SVP 196 etc. The SVP 196 indicates a graphic representing the actual state of the apparatus configuration by the GUI display and also indicates the information of the PK to be a replacement object and the position into/from which the PK is inserted/drawn, thereby precisely giving the instructions to the maintenance worker. Additionally, even when the PKs are sequentially replaced, the SVP indicates an operating procedure regarding the order of and positions for inserting/drawing the PKs, thereby giving the instructions thereto.

Next, the functions of the LEDs 107 and 227 for maintenance and a concrete example of their control will be described. The LEDs 107 and 227 in the base 101 and the functional PK 102 are controlled, respectively, whereby the detection of the PK failure and the PK to be a maintenance/replacement object are recognized by the maintenance worker. Particularly, by the control of the SVP 196, the position and procedure of the PK replacement are indicated by the GUI display and the LED of the PK to be a replacement object is lighted up. When the PK is inserted/drawn, the management information of the SVP 196 and a state of the actual inserted/drawn PK are checked and if the PK is improperly connected, the SVP 196 notifies the maintenance worker of the PK misconnection. For example, each of the base PK 101 and the functional PK 102 has yellow and red as the LEDs 107 and 227 for maintenance. When a power supply system of the PK (e.g., functional PK 102) is failed, the yellow LED is lighted up. Thereby, the maintenance worker can recognize that the power supply system of the PK is failed. When the SVP 196 indicates the PK that is a replacement object, the red LED is lighted up. Thereby, the maintenance worker can recognize the replacement-object PK. During insertion/draw of the PK, even if the configuration information of the SVP 196 etc. and the managed apparatus configuration are compared and do not coincide with each other, the predetermined LED of the pertinent PK is lighted up. Thereby, the maintenance worker can recognize the PK misconnection. The LEDs 107 and 227 are controlled by the SVP 196, the inside of the base PK 101, the inside of the functional PK 102, and/or the external PK, etc. through the control line from the LN 103.

Instead of providing the LED to each package, a LED of which display is controlled depending on a package condition and an operation of maintaining/managing the package may be provided on a side of the chassis having the slot for inserting the package. The SVP 196 controls the display of the LED of the slot corresponding to the insertion/draw position of the PK in the same way.

<Addition, Failure, and Replacement of PK>

Figure 10A:
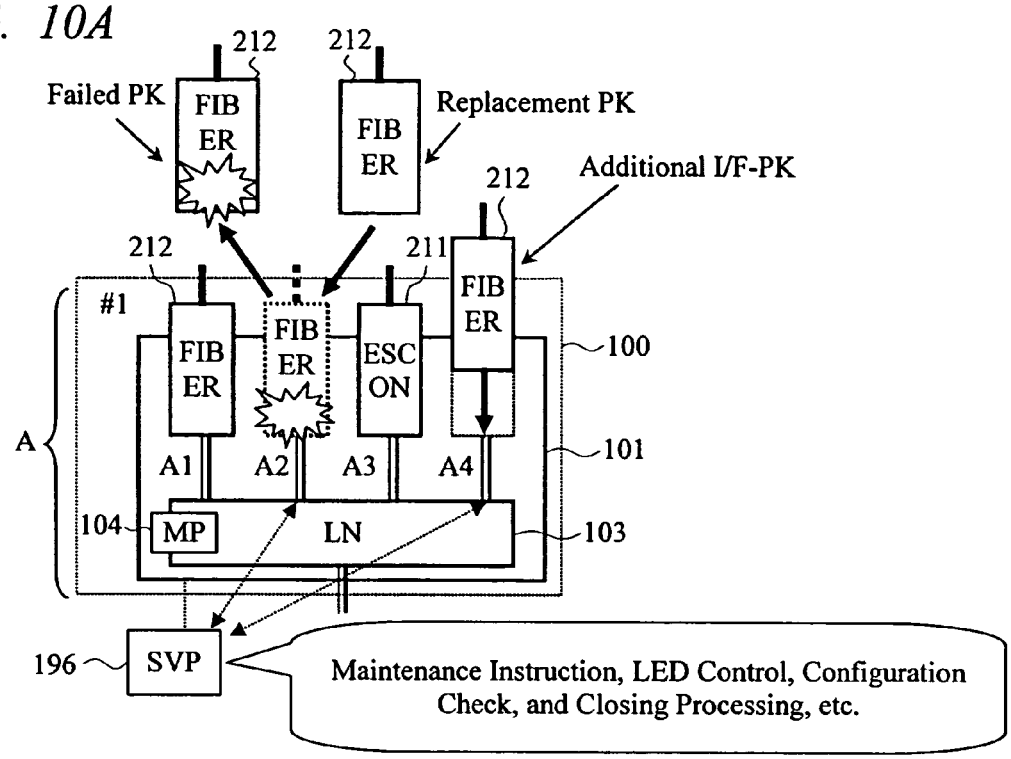
FIG. 10A is an explanatory view for showing, as an example of PK replacement and maintenance in the disk array apparatus according to the embodiment of the present invention, an example of addition of the functional PK and replacement at a time of occurrence of failures.

A maintenance example of PK and a processing thereof will be described. FIG. 10A shows an example of addition and replacement of the functional PK 102 when its failure occurs. Herein, the DKC 10, which is premised in this embodiment, has the same configuration as that in FIG. 8. The slots into which the base PKs 101 are inserted in the DKC box 194 are denoted by reference symbols {A, B, C, D, . . . }, respectively. The slots into which the functional PKs 102 are inserted in each base PK 101 are denoted by reference symbols (A1, A2, A3, and A4). The mix PK #1 (100) is connected to the slot A and the mix PK #3 (100) is connected to the slot B, respectively. The maintenance worker inserts/draws the PKs in accordance with the GUI display by the SVP 196. The SVP 196 performs a maintenance instruction by the GUI display, a display control for each LED, a check of the PK configuration using the ID, a closing processing of the failed PK, and the like between the SVP 196 and the mix PK 100.

As for the case where the functional PK 102 is added, the case where the fiber I/F-PKs 212 are newly inserted into the unused slots A4 and B4 in the mix PKs #1 and #3 of the CLs #1 and #2, respectively, will be described. Firstly, the maintenance worker prepares an additional fiber I/F-PK 212 for the mix PK #1 (100) of the CL #1. Next, the maintenance worker inserts the additional fiber I/F-PK 212 into the pertinent slot A4 of the base PK 101 in the DKC box 194 in accordance with the instruction of the SVP 196. Next, the DKC 10 and the SVP 196 read the ID of the inserted functional PK 102, compare the ID with the configuration information, and check whether the comparison result match with an intended configuration. If it does not match, the misconnection of the functional PK is notified. Next, when it is checked that the intended configuration is obtained, the inserted and connected I/F-PK 212 is diagnosed and incorporated in the system of the DKC 10. The diagnosis is made to check whether the inside of the PK can operate normally as hardware. Next, the maintenance worker newly inserts the I/F-PK 212 into the slot B4 in the mix PK #3 (100) on a side of the CL #2 using the same procedure as that on a side of the CL #1.

As for the case where the functional PK 102 is replaced with another functional PK, a description will be made of the case where the fiber I/F-PK 212 in the slot A2 is replaced with another fiber I/F-PK 212 because it is failed in the mix PKs #1 and #3 (100) of the CL #1. Firstly, it is detected that the fiber I/F-PK 212 in the slot A2 is failed. The MP having detected the failure captures the fault information and performs a closing processing to the pertinent functional PK 102. The closing processing is a processing for logically separating a portion of the pertinent PK from the system. Next, by the MP having detected the fault, for the slot A2 to be closed is reported to other MPs in the DKC 10. Then, when recognizing that the slot A2 is closed, the other MPs in the DKC 10 handle the slot A2 as a closed slot, i.e., as a closed state in order to prevent the slot A2 from being used. Next, by the MP having detected the fault, the report on the occurrence of failure in the slot A, i.e., the failure report on the closed portion in the slot A2, is made to the SVP 196 and a PK-replacement request is made to the SVP 196. When receiving the failure report and the PK-replacement request, the SVP 196 changes the logical configuration and the state of the DKC 10 based on the failure information etc. from the MP. That is, the configuration information etc. are changed in conformity to the occurrence of the PK closing. Then, the SVP 196 notifies the maintenance worker of the failure occurrence of the functional PK and of the PK-replacement request according to need.

Next, a replacement procedure of the failed PK will be described. Firstly, the maintenance worker prepares a replacement fiber I/F-PK 212. In accordance with the instructions of the SVP 196, a representative MP makes a processing for the failed PK (212) in the slot A2 stop and the failed PK (212) move to the closed state. The representative MP is one MP etc. unused among the plurality of MPs present in the DKC 10, e.g., the MP 104 in the base PK 101. At this time, by the representative MP, the LEDs 227 are made to light up for indicating the replacement instruction of the PK and instruct the maintenance worker to perform the processing for the replacement the PK. Next, the SVP 196 confirms the slot A2 into which the failed PK (212) is inserted. The confirmation is made for checking whether the closed portion and the functional PK (212) lighted up by the LED 227 correspond to each other. Next, the maintenance worker draws out the failed PK (212) from the slot A2 and inserts the replacement PK (212) therein. By the SVP 196, for the fiber I/F PK 212 to have been replaced is reported to the representative MP. The SVP 196 reads the ID of the PK (212) having been inserted into the slot A2 and checks whether the ID matches with the intended configuration. If the intended configuration is obtained, the representative MP diagnoses the pertinent functional PK (212) and incorporates it in the system of the DKC 10. By the representative MP, for the fiber I/F-PK 212 in the slot A2 to be newly incorporated in the system is reported to the other MPs in the DKC 10. By the representative MP, completion of newly incorporation of the fiber I/F-PK 212 is reported to the SVP 196, whereby the SVP 196 updates the configuration information. Note that even while the above-mentioned functional PK 102 is failed and replaced, the functional PKs 102 in the slots A1 and A3 are operable and replaced and can perform the operations as shown in FIG. 8.

Figure 10B:
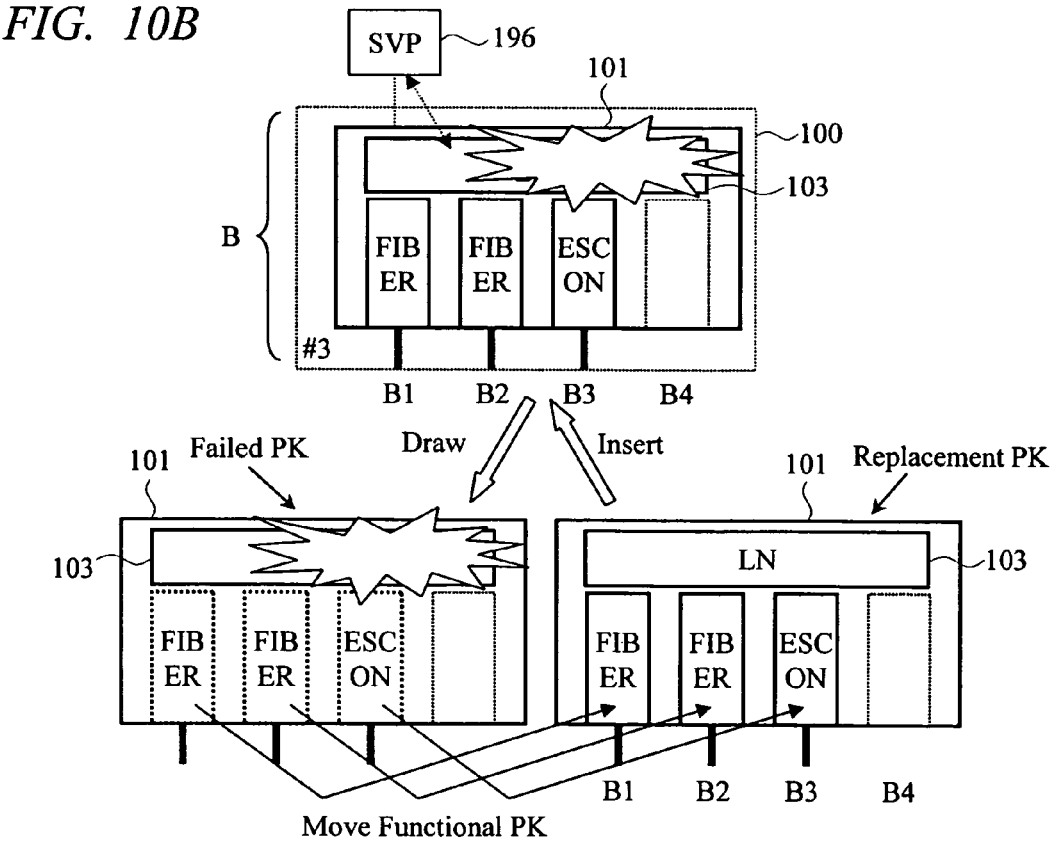
FIG. 10B is an explanatory view for showing, as an example of PK replacement and maintenance in the disk array apparatus according to the embodiment of the present invention, an example of replacement of a base PK/mix PK at the time of occurrence of the failures.

FIG. 10B represents a replacement example of the base PK 101/mix PK 100 at a time of occurrence of failure. In this case, the DKC 10, which is premised in this embodiment, has the same configuration as that in FIG. 8. As for the case where the base PK 101/mix PK 100 are replaced with another PK, a description will be made of the case where the base PK 101 is replaced with another PK because it is failed in the mix PK #3 (100) of the CL #2.

Firstly, it is detected that a failure occurs in the base PK 101 of the slot B, i.e., in the LN 103. The MP detecting the fault captures the fault information and performs a closing processing to the base PK 101. Next, by the MP having detected the fault, for the slot B to be closed is reported to other MPs in the DKC 10. When recognizing that the slot B is closed, the other MPs in the DKC 10 handle the slot B as a closed slot, i.e., as a closed state in order to prevent the slot B from being used. Next, by the MP having detected the fault, a report on the occurrence of failure of the slot B, i.e., a failure report on a closed portion in the slot B is made to the SVP 196 and a PK-replacement request is made to the SVP 196. When receiving the failure report and the PK replacement request, the SVP 196 changes the logical configuration and the state of the DKC 10 based on the failure information etc. from the MP. Then, by the SVP 196, the occurrence of failure of the base PK 101 and the PK-replacement request are notified to the maintenance worker according to need.

Next, a procedure for replacing the failed PK 101 per mix PK #3 (100) will be described. Firstly, the maintenance worker prepares the base PK 101 for replacement. In accordance with the instructions of the SVP 196, the representative MP makes a processing for the failed PK (101) in the slot B stop and the slot B move to a closed state. At this time, by the representative MP, the LED 107 indicating the instruction on the replacement of the failed PK (101) is made to light up, whereby the instruction of the PK replacement is given to the maintenance worker. Next, the SVP 196 confirms the slot B into which the failed PK (101) is inserted. The confirmation is made to check whether the closed portion and the base PK (101) at which the LED 107 is lighted up correspond to each other. Then, the maintenance worker draws out the failed PK (101) from the slot B per mix PK #3 (100) and inserts the mix PK (100) in which each functional PK 102 is mounted on the replacement base PK 100. At this time, the maintenance worker forms the replacement mix PK (100) by moving the respective functional PKs 102 from the inside of the failed PK (101) to the inside of the replacement base PK (101) without changing the positional relationship of them. After the replacement PK is inserted into the slot B, for the base PK 101 to have been replaced is reported to the representative MP from the SVP 196. The SVP 196 reads the ID of the base PK 101 inserted into the slot B and checks whether a content of the ID matches with an intended configuration. If the intended configuration is obtained, the representative MP diagnoses the pertinent base PK 101 and incorporates it in the system of the DKC 10. By the representative MP, for the base PK 101 in the slot B to be newly incorporated in the system is reported to the other MPs in the DKC 10. The representative MP reports completion of new incorporation of the base PK to the SVP 196, and the SVP 196 updates the configuration information.

If the plurality of functional PKs 102 such as I/Fs are replaced in the same mix PK 100, the individual I/F-PKs 210 may be sequentially replaced. In addition, by performing an operation for replacing the functional PK 102 per base PK 101, the maintenance work can be reduced as occasion arises.

<External Connection (1)>

Figure 11:
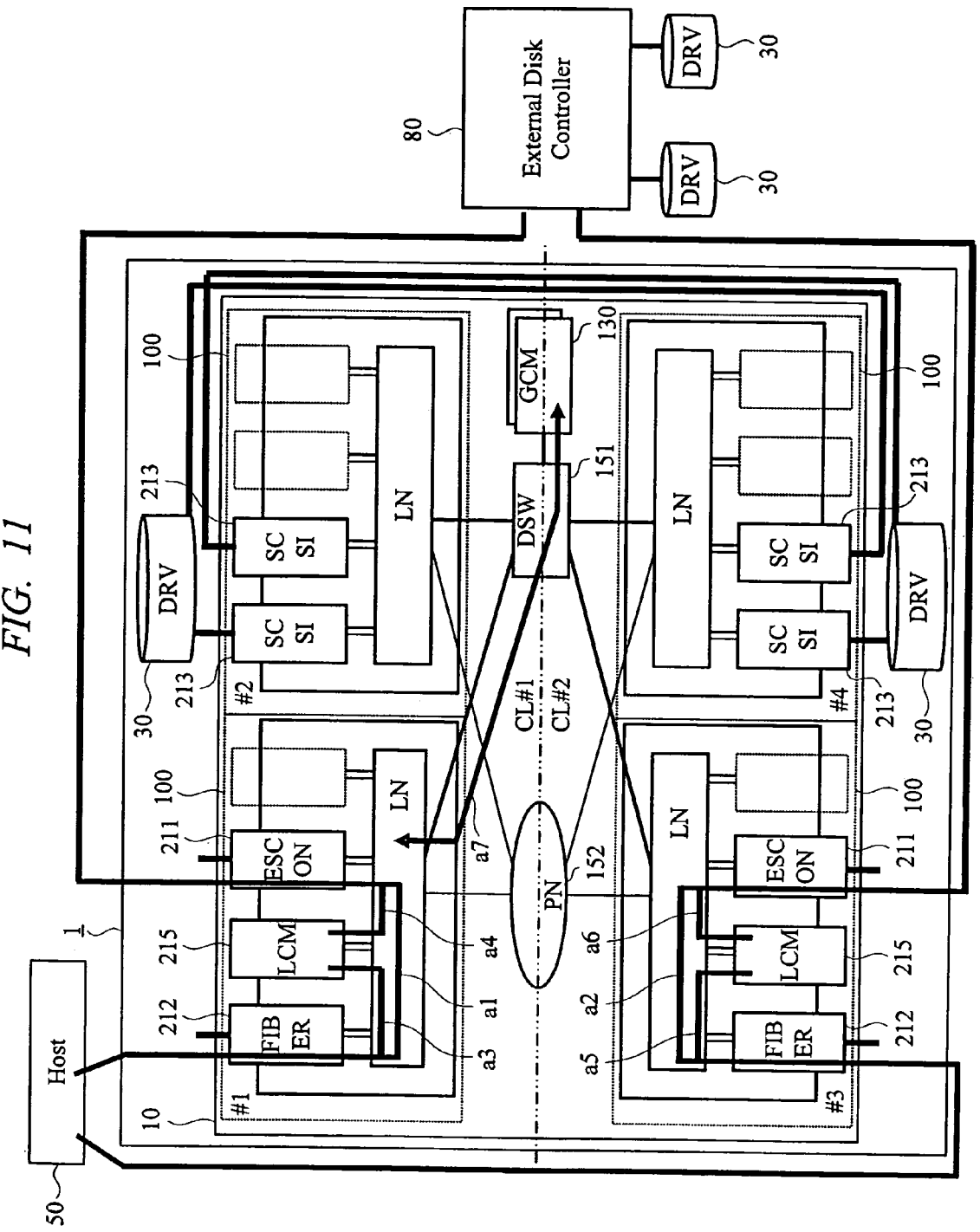
FIG. 11 is a block diagram showing a first configuration example at a time of communicatively connecting an external disk controller in the disk array apparatus according to the embodiment of the present invention.

Next, FIG. 11 shows a first configuration example when the external disk controller 80 is communicatively connected to the disk array apparatus 1. The configuration in this embodiment is the case where the different kinds of channel I/F-PKs are combined so as to correspond to the I/F for the host 50 and the I/F for the external disk controller 80 in the same mix PK 100. The configuration of the DKC 10, which is premised in the embodiment, is the same as that shown in FIG. 8, and particularly shows the case where the LCM-PKs 215 are connected to the positions (slot A2 and B2) of second fiber I/F-PKs 212 in the mix PKs #1 and #3 (100). The host 50 is connected to the fiber I/F-PKs 212 in the mix PKs #1 and #3 (100) of the CLs #1 and #2 within the DKC 10, and the external disk controller 80 is connected to the ESCON-I/F-PKs 211. The external controller 80 is a device for controlling the data input/output to the storage unit such as the DRV 30 connected thereto, for example, a device which is of the same kind as that of the disk array apparatus 1, a disk array apparatus of another kind, or the other information processors. Note that although the configuration as shown in this Figure has any MPs in each mix PK 100, such MPs will be omitted in the Figure.

Operations a1 and a2 represent the flows of the data transfer between the host 50 and the external disk controller 80 when no LCM-PKs 215 exist in the mix PKs #1 and #3 (100). Operations a3 and a5 represent the flows of the data transfer between the host 50 and the external disk controller 80 when the LCM-PKs 215 exist in the mix PKs #1 and #3 (100). Operations a4 and a6 represent the flows of the data transfer between the LCM and the external disk controller 80 when the LCM-PKs 215 exist in the mix PKs #1 and #3 (100). An operation a7 represents the flow of the data cache with respect to the GCM 130 as shown in FIGS. 8 and 9 when data is transferred to/from the external disk controller 80. The operation a7 may be combined with the operations a1 to a6.

Hereinafter, a processing example of the case where the data transfer is performed between the disk array apparatus 1 and the external disk controller 80 will be described. Firstly, the disk array apparatus 1 receives the command from the host 50 in the mix PK #1 or #3 (100) in the CL #1 or #2 through the fiber I/F-PK 212. Any one of the MPs in the mix PKs #1 and #3 (100), for example, the MP 104 in the base PK 101 analyzes the received command. The above-mentioned MP confirms the port to be a transfer destination by the analysis. For example, the received command is a data write request and an address of the transfer destination is an area of the DRV 30 connected to the external disk controller 80. In this case, the port in the ESCON-I/F-PK 211 connecting the external disk controller 80 in the same mix PK 100 is a transfer-destination port. The pertinent port is a transfer-source port to the external disk controller 80.

The MP checks whether the transfer-destination port to the external disk controller 80 resides in the own mix PK 100 and/or whether the request data resides in the LCM and/or GCM 130. When the transfer-destination port resides in the own mix PK 100 and the LCM does not reside, the MP gives a transfer instruction to the pertinent I/F-PK (211) by the LN 103. The I/F-PK (211) receiving the data in accordance with the above transfer instruction transfers the data to/from the external disk controller 80. The external disk controller 80 reads/writes the transferred data to the DRV 30. The data can be transferred between the host 50 and the external disk controller 80 without interposing the LCM by using the operation a1.

When the LCM resides in the same mix PK 100, the MP gives the transfer instruction to the pertinent LCM-PK 215 by the LN 103. The LCM-PK 215 receiving the data according to the transfer instruction transfers the data to/from the external disk controller 80 by way of the processing for the ESCON-I/F-PK 211 in the same mix PK 100. The data can be transferred between the host 50 and the external disk controller 80 through the LCM by using to the operations a3 and a4. When the request data is stored in the LCM, the data transfer processing is performed using the cache data on the LCM.

The different kinds of I/Fs coexist in the same mix PK 100, so that the LN 103 can be used when the data is transferred between the different kinds of I/Fs and the external disk controller 80. Therefore, the data transfer can be speeded up without using the DSW 151 etc. Additionally, if the different kinds of I/Fs and the LCM coexist, the cache hit ratio can be improved using the LCM when the data is transferred to/from the external disk controller 80, so that the data transfer can be speeded up.

<External Connection (2)>

Figure 12:
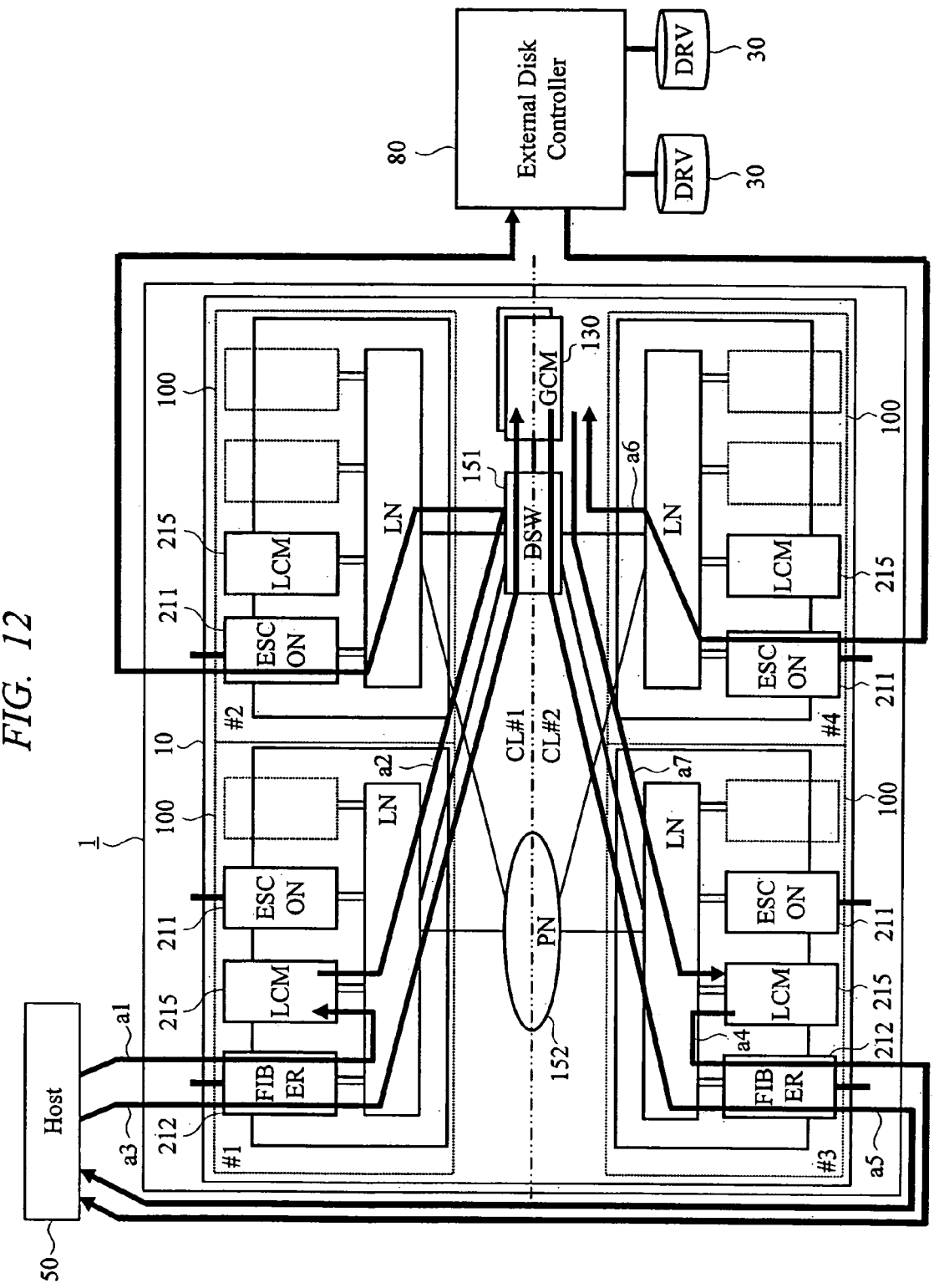
FIG. 12 is a block diagram showing a second configuration example at the time of communicatively connecting the external disk controller in the disk array apparatus according to the embodiment of the present invention.

Next, FIG. 12 is a second configuration example when the external disk controller 80 is communicatively connected to the disk array apparatus 1. The configuration in this embodiment is the case where a transfer-destination port to the external disk controller 80 resides in the I/F-PK 210 not within the same mix PK 100 but within the other mix PK 100, that is, the case where the different kinds of channel PKs are combined in each mix PK 100. In the CLs #1 and #2 in the DKC 10, the mix PKs #1 and #3 (100) include the fiber I/F-PK 212, the LCM-PK 215, ESCON-I/F-PK 211, and one unused I/F-PK, and the mix PKs #2 and #4 (100) include the ESCON-I/F-PK 211, the LCM-PK 215, and two unused I/F-PKs. The host 50 is connected to the fiber I/F-PKs 212 in the mix PKs #1 and #3 (100). The external disk controller 80 is connected to the ESCON-I/F-PKs 211 in the mix PKs #2 and #4 (100). Particularly in the embodiment, there is shown the case where the LCM-PKs 215 are connected to slots (A2, B2, C2 and D2) in the respective mix PKs #1 to #4. Note that although the configuration as shown in this Figure has the MP in each mix PK 100, the MP will be omitted in Figure.

A description will be made of the case where the command from the host 50 is received at the mix PK #1 (100) in the CL #1 and the data transfer for writing the data to the external disk controller 80 through the ESCON-I/F in the mix PK #2 (100) is performed.

An operation a1 represents a flow of data write from the host 50 to the LCM in the mix PK #1 (100) through the fiber I/F-PK 212. An operation a2 represents a flow through which the data written into the LCM in the mix PK #1 (100) is written into the external disk controller 80 through the DSW 151 and the mix PK #2 (100). An operation a3 represents a flow through which the data from the host 50 is written into the GCM 130 within the DKC 10 through the fiber I/F-PK 212 in the mix PK #1 (100).

For example, if the LCM exists in the data transfer from the host 50 to the external disk controller 80, the operations a1, a2 and a3 are sequentially performed or only the operations a1 and a2 are performed sequentially. If the cache data resides in the LCM, only the operation a2 is performed. Especially, both of the operations a1 and a3 may be concurrently performed in parallel, that is, a double data write processing with respect to the LCM and the GCM 130 may be performed to doubly cache the data.

Next, a description will be made of the case where the command from the host 50 is received at the mix PK #3 (100) in the CL #2 and the data transfer for reading the data to the external disk controller 80 through the ESCON-I/F in the mix PK #4 (100) is performed.

An operation a4 represents a flow of the data read from the LCM in the mix PK #3 to the host 50 through the fiber I/F-PK 212. An operation a5 represents a flow through which the data is read from the GCM 130 to the host 50 through the fiber I/F-PK 212 in the mix PK #3(100). An operation a6 represents a flow through which the data is read from the DRV 30 in the external disk controller 80 through the ESCON-I/F-PK 211 in the mix PK #4 and stored in the GCM 130. An operation a7 represents a flow through which the data is read from the GCM 130 and stored in the LCM in the MIX PK #3(100).

For example, if the LCM exists in the data transfer from the host 50 to the external disk controller 80, the operations a6, a7 and a4 are performed sequentially in this order or the operations a6, a5 and a7 are sequentially performed. If the LCM does not exist, the operations a5 and a6 are sequentially performed. If the cache data exists in the LCM, only the operation a4 is performed. If the cache data exists in the GCM 130, only the operation a5 is performed or the operations a7 and a4 are sequentially performed. Especially, both of the operations a6 and a7 may be concurrently performed in parallel, that is, a double data write processing to the LCM and the GCM 130 is performed to doubly cache the data.

<Processing Flow (1)>

Figure 13:
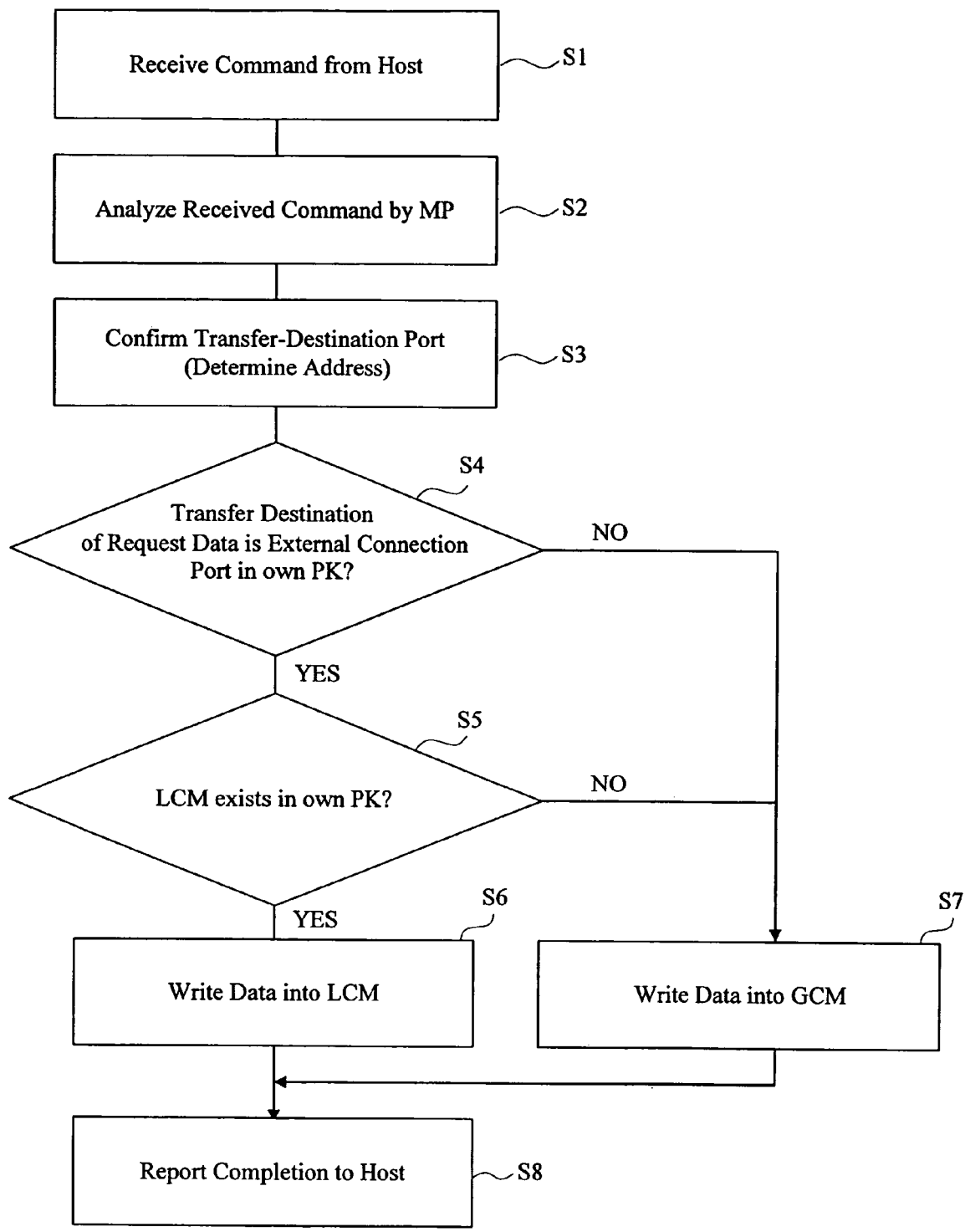
FIG. 13 is a flowchart showing a data-write processing as a first flow of a data-transfer processing at the time of connecting the external disk controller in the disk array apparatus according to the embodiment of the present invention.

FIG. 13 represents a data write processing as a first flow of a data transfer processing when the external disk controller 80 is connected to the disk array apparatus 1. The configuration of the DKC 10 depends on those as shown in FIGS. 8 and 9.

A description will be made of the case where a write request and write data from the host 50 are received at the mix PK 100. Firstly, the I/F-PK 210 in the mix PK 100 receives a command (write command) corresponding to a write request from the host 50 in step S1. Next, any one of the MPs in the DKC 10, for example, the MP in the same mix PK 100 analyzes the received command in step S2. Next, the MP confirms a port to be a transfer destination in step S3. That is, the MP determines a memory area and an address to be transfer destinations. Next, the MP determines whether a storing position of the request data in the command, i.e., the transfer-destination port corresponding to a write destination is an external connection port in the I/F-PK 210 within the own mix PK 100 in step S4. If the port does not exist in the own mix PK 100 (NO), the write data is transferred to the GCM 130 through the DMA-data transfer processing in the pertinent I/F-PK 210 in accordance with the instruction of the MP and is stored in step S7. The pertinent I/F-PK 210 reports the completion of the above transferring and storing processing to the host 50 in step S8.

If the port exists in the mix PK 100 (YES) in the step S4, the MP checks whether the LCM exists in the own mix PK 100 in step S5. If the LCM does not exist (NO), the data is written into the GCM 130 in the step S7 and its completion is reported to the host 50 in the step S8. If the LCM exists (YES) in the step S5, the write data is transferred to the LCM in the own mix PK 100 by step 6 and stored. Then, the completion is reported to the host 50 by the step S8.

Further, if the data is written into the LCM in the step S6, the data is concurrently written also into the GCM 130 (operations a1 and a3 in FIG. 12), whereby the data can be secured by utilizing the other CMs even if either of the LCM or the GCM is failed.

<Processing Flow (2)>

Figure 14:
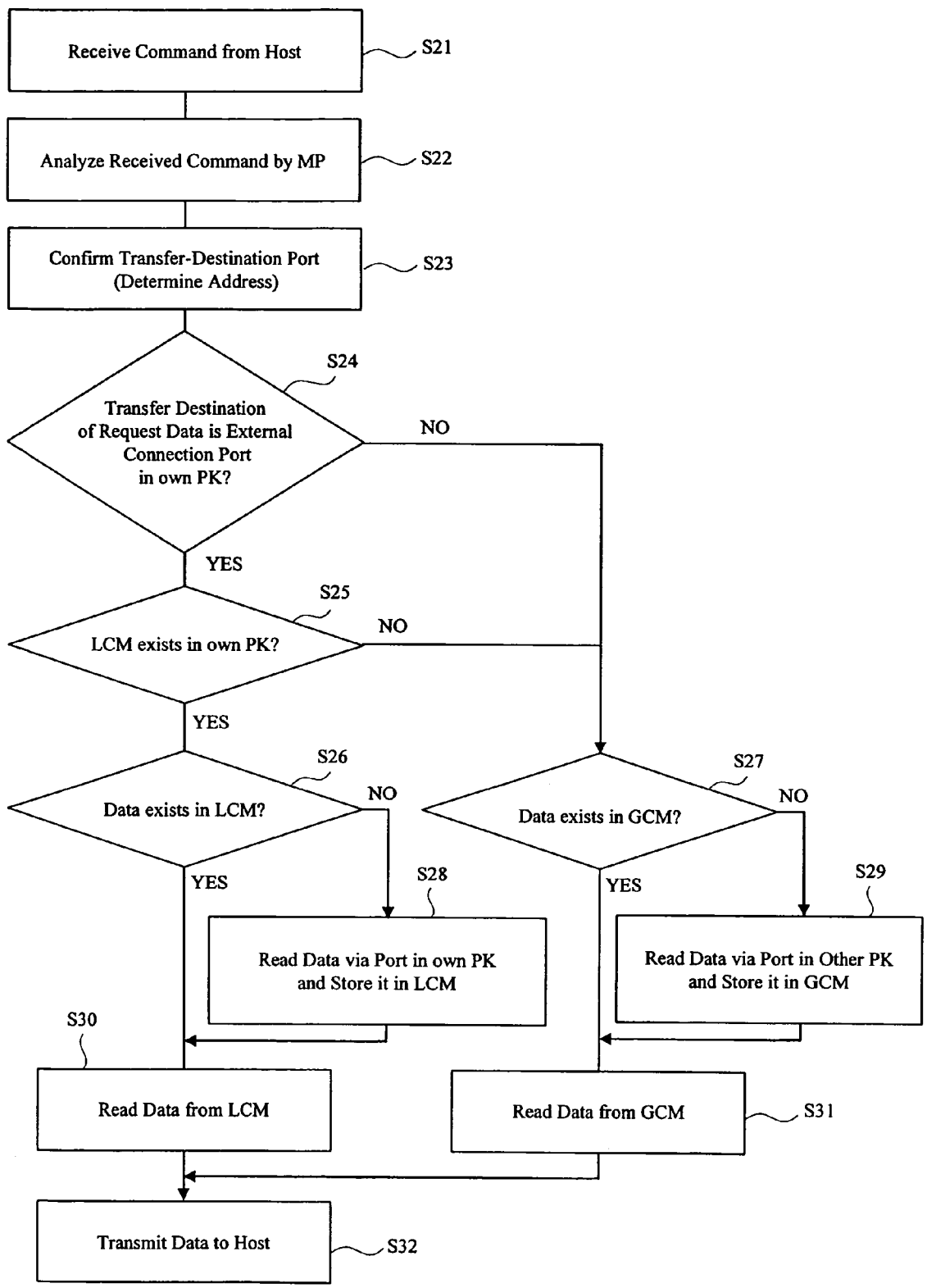
FIG. 14 is a flowchart showing a data-read processing as a second flow of the data-transfer processing at the time of connecting the external disk controller in the disk array apparatus according to an embodiment of the present invention.

FIG. 14 represents a data read processing as a second flow of a data-transfer processing when the external disk controller 80 is connected to the disk array apparatus 1.

A description will be made of the case where a read request from the host 50 is received at the mix PK 100. Firstly, the I/F-PK 210 in the mix PK 100 receives a command corresponding to a read request from the host 50 in step S21. Next, any one of the MPs in the DKC 10 analyzes the received command in step S22. Next, the MP confirms a port to be a transfer destination in step S23. Next, the MP determines in step 24 whether a storing position of the request data in the command, i.e., a transfer-destination port corresponding to a read destination is an external connection port in the I/F-PK 210 within the own mix PK 100. If the port does not exist in the own mix PK 100 (NO), this procedure moves to step S27.

The MP checks in the step S27 whether the request data, i.e., read-object data exists in the GCM 130. If the request data does not exist (NO), the request data is read from the DRV 30 on a side of the external disk controller 80 via an external connection port in the other mix PK 100 by way of the DSW 151, by the DMA-data transfer processing in the pertinent I/F-PK 210 according to the instruction by the MP, and stored in an area of the GCM 130 in step S29, and this procedure moves to step S31. If the request data exists in the GCM 130 (YES), this procedure moves to the step S31.

The request data is read from the GCM 130 through the DMA-data transfer processing in the pertinent I/F-PK 210 in the step S31. The read data is transmitted from the pertinent I/F-PK 210 to the host 50 in step S32.

If the port exists in the own mix PK 100 (YES) in the step S24, the MP checks whether the LCM exists in the own mix PK 100 in step S25. If the LCM does not exist (NO), a processing following the step S27 is performed (using the port in the own mix PK 100). If the LCM exists (YES) in the step S25, the MP checks whether the request data exists in the LCM in step S26. If the request data does not exist in the LCM (NO), the request data is read from the DRV 30 on a side of the external disk controller 80 via an external connection port in the I/F-PK 210 within the own mix PK 100 in step S28. The read data is stored in the LCM. Then, this procedure moves to step S30. If the request data exists in the LCM (YES), this procedure moves to the step S30.

The request data is read from the GCM 130 through the DMA-data transfer processing in the pertinent I/F-PK 210 in the step S30. The read data is transmitted from the pertinent I/F-PK 210 to the host 50 in step S32.

By copying the local data from the GCM 130 to the LCM in the above-described processing, the cache access performance can be improved and the copied data can be deleted from the area of the GCM 130.

<Connection Example of Processor (1)>

Next, respective configurations of the interconnection and the control communication between the MPs in the DKC 10 will be shown as the disk array apparatus 1 according to an embodiment of the present invention will be described. The PN 152 is used for communication between the PKs through each mix PK 100. The PN 152 is connected to not only the processor in a certain mix PK 100, for example, the MP 104 in the base PK 101 and the MP 240 in the MP-PK 216, but also the processor in the other mix PK 100.

In a scheme for control communication in the conventional DKC, a shared memory is used to establish communication between the MPs in the control PKs such as the CHA and the DKC. However, since a scheme for the PN 152 is provided in the present embodiment, the conventional scheme is made unnecessary. As a control example, in a processing in which the data from the host 50 is written into the DRV 30 in the disk array apparatus 1, since the above write processing is controlled by only one MP, it can be smoothly performed without communicating between the MPs. Further, since the data is transferred from the MP 104 of the base PK 101 or from the MP 240 of the MP-PK 216 in a certain mix PK 100 to the other mix PK 100, the data transfer can be controlled. Thereby, the MPs in the DKC 10 can be used without waste to improve efficiency of the processing. Additionally, since only MPs may be added by connecting the MP-PK 216, the processing performance can be improved according to need when it is required. Any MPs in the DKC 10 can be used in the data-transfer control, and particularly a certain MP in the mix PK 100 having the I/F port to be a transfer destination can be used to improve efficiency of the processing.

For example, the form of the interconnection of the MP and the PN 152 is as follows. Firstly, the PN 152 is interconnected by a switch connection or bus type connection. Secondary, the respective MPs in each mix PK 100 are directly interconnected to each other. Thirdly, the PN 152 is interconnected by the switch connection, in which the switch includes a memory I/F and the memory is used as a shared resource among the MPs.

FIG. 15 shows a first configuration example of the interconnection and the control communication between the MPs in the DKC 100, as the disk array apparatus 1 according to an embodiment of the present invention, wherein the MPs and the PN 152 are interconnected by the switch connection. A PSW (processor path control switch) 153 as the PN 152 is provided in parallel with the DSW 151. Note that the SVP 196 and the LAN 190 are omitted in this Figure. The PSW 153 is globally connected between the MPs in each PK, thereby controlling switching of the processor path.

Each of the mix PKs #1 and #3 (100) in the CLs #1 and #2 includes the ESCON-I/F-PK 211, the fiber I/F-PK 212, the LCM-PK 215, and the MP-PK 216. The mix PK #2 (100) in the CL #1 has the two fiber I/F-PKs 212 and the two MP-PKs 216. The mix PK #4 (100) in the CL #2 has the fiber I/F-PK 212, the SCSI-I/F-PK 213, the MP-PK 216, and one unused PK.

An operation a1 represents the control connection in the case where, in being controlled by the I/F-PK 210 in a certain mix PK 100, the data transfer in the I/F-PK 210 is controlled through the PSW 153 by the MP which the mix PK other than the certain mix PK 100 has. For example, when the I/F control of the DRV 30 is controlled through the SCSI-I/F-PK 213 in the MIX PK #4 (100) of the CL #2, the MP 240 of the MP-PK 216 in the mix PK #1 (100) of the CL#1 controls the data transfer processing in the SCSI-I/F-PK 213 through the PSW 153.

An operation a2 represents the control connection in the case where the MP in the mix PK 100 controls the data transfer processing to the I/F-PK in the same PK. For example, the MP 240 of the MP-PK 216 in the mix PK #2 (100) controls the data transfer processing in the fiber I/F-PK 212 within the same PK.

<Connection Example of Processor (2)>

FIG. 16 shows a second configuration example of the interconnection and the control communication between the MPs in the DKC 10, as the disk array apparatus 1 according to the embodiment of the present invention, wherein the MPs are directly connected to each other. The LNs 103 in each mix PK 100 are directly interconnected through the control line. The other configuration is the same as that of FIG. 15. The configuration in this embodiment can perform the data transfer processing at high speed since the switch is not interposed during the data transfer processing.

An operation a1 represents the control connection in the case where, in being controlled by the I/F-PK 210 in a certain mix PK 100, the data transfer in the I/F-PK 210 is controlled through the control line between the MPs by the MP which the mix PK 100 other than the certain mix PK has. For example, when the I/F control of the DRV 30 is executed through the SCSI-I/F-PK 213 in the MIX PK #4 (100) of the CL #2, the MP 240 of the MP-PK 216 in the mix PK #1 (100) of the CL#1 controls the data transfer processing in the SCSI-I/F-PK 213 through the control line between the MPs.

<Connection Example of Processor (3)>

FIG. 17 shows a third configuration example of the interconnection and the control communication between the MPs in the DKC 10 within the disk array apparatus 1 according to the embodiment of the present invention. This present configuration uses, as the PN 152, a configuration in which the MPs are interconnected through a PSW (processor path control switch) 154 and a memory 155 connected to the PSW 154 is provided for exchanging information between the MPs. The LN 103 in each mix PK 100 is connected to the PSW 154.

The other configuration is the same as that in FIG. 15. The PSW 154 controls not only the connection between the MPs but also reading/writing to/from the memory 155 similarly to the PSW 153. The memory 155 is used to store the control information etc. shared among the MPs. Note that a region for storing the control information etc. shared among the MPs is not limited to the memory 155 and may be a region in the LCM or GCM 103.

An operation a1 represents the control connection in the case where, in being controlled by the I/F-PK 210 in a certain mix PK 100, the data transfer in the I/F-PK 210 is controlled through the PSW 154 by the MP that the mix PK 100 other than the certain mix PK has. For example, when the I/F control is performed through the fiber-I/F-PK 212 in the MIX PK #1 (100) of the CL #1, the MP 240 of the MP-PK 216 in the mix PK #2 (100) of the CL#1 controls the data transfer processing in the fiber-I/F-PK 212 through the PSW 154.

An operation a2 represents the connection in the case of accessing the PWS 154 serving as the PN 152 in order to read/write the control information to/from the memory 155. For example, the MP 240 of the MP-PK 216 in the mix PK #3 (100) of the CL #2 accesses the memory 155 through the PSW 154 to read/write the control information for the communication between the MPs.

<Example of Data Transfer Processing (1): Triple Write Processing>

Figure 18:
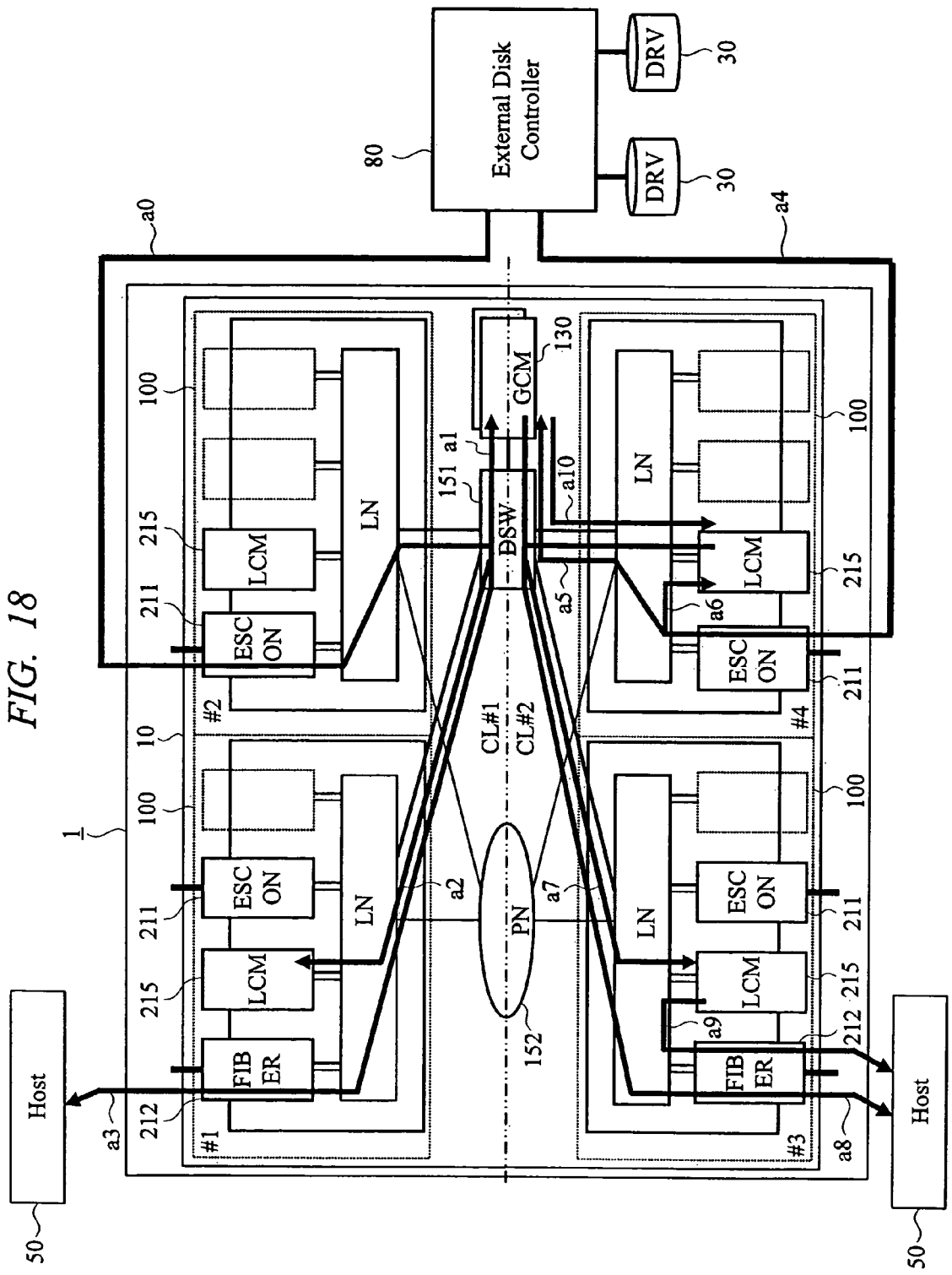
FIG. 18 is a block diagram showing a triple write processing used as a first processing example and a pre-read processing used as a second processing example, which are included in a data-transfer processing example, in the disk array apparatus according to the embodiment of the present invention.
Figure 19:
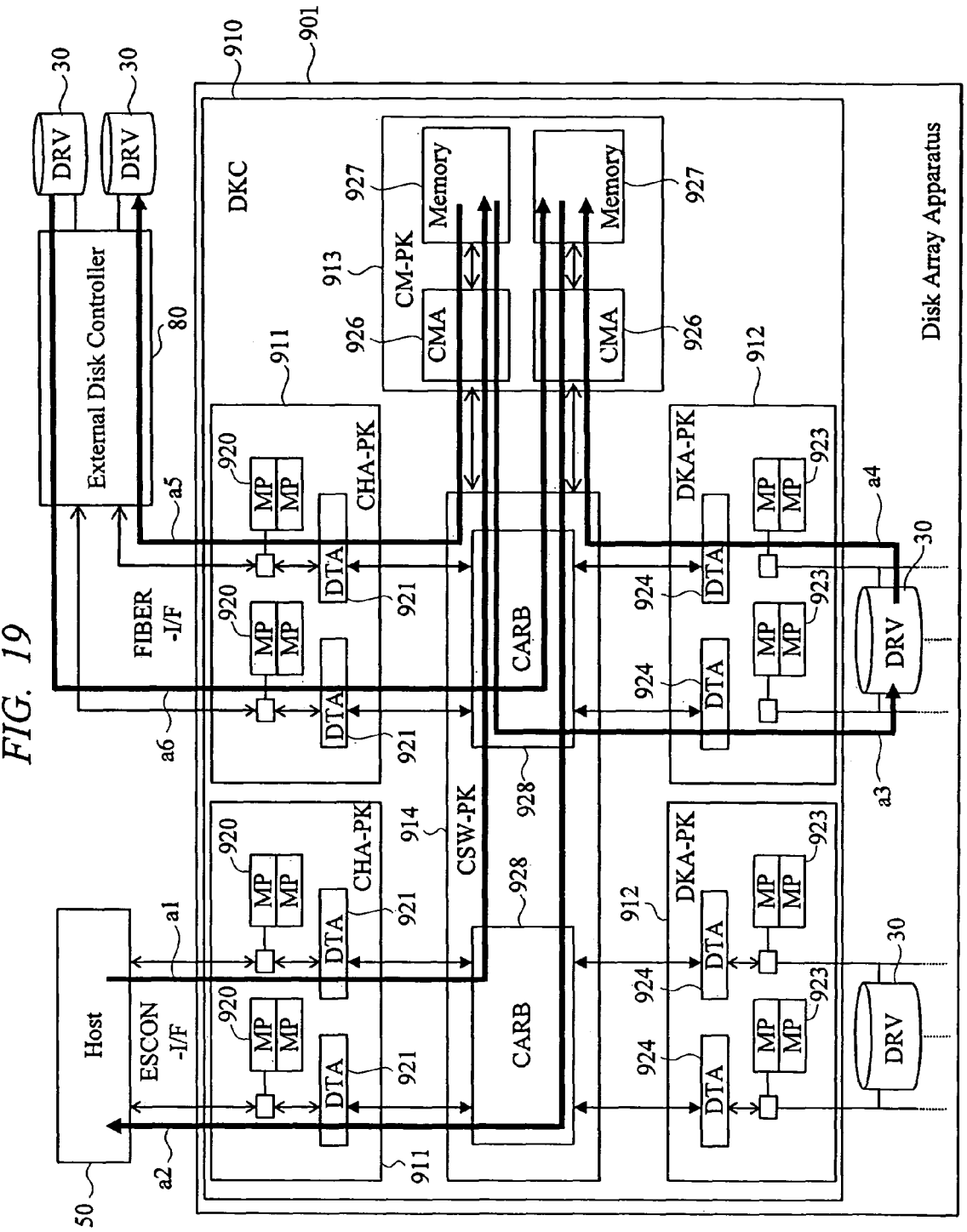
FIG. 19 is a block diagram showing a configuration example of the DKC in a conventional disk array apparatus, and especially representing a connection structure and a data-transfer operation with the external disk controller.

FIG. 18 shows an example of the data transfer processing in the disk array apparatus 1 according to the embodiment of the present invention. As a first example of the processing, a description will be made of the case where the disk array apparatus 1 reads the data from the DRV 30 connected to the external disk controller 80, particularly, performs a triple write processing of data. Herein, the configuration to be premised is the same as that of FIG. 12.

An operation a0 represents a flow in which the ESCON-I/F-PK 211 having the port connected to the external disk controller 80 reads the data from the DRV 30 in the external disk controller 80, stores the data in the buffer 251 in the own PK, and transfers it to the DSW 151 in the mix PK #2 (100) of the CL #1. For example, operations a1 to a3 may follow the operation a0.

The operation a1 represents a flow in which the ESCON-I/F-PK 211 in the mix PK #2 (100) writes the data from the buffer 251 to the GCM 130 through the DSW 151. Since the data is stored as the cache data in the GCM 130, the cache hit ratio can be made high by using the GCM 130 in being accessed from the other mix PK 100.

The operation a2 represents a flow in which the ESCON-I/F-PK 211 writes the read data to the LCM in the mix PK #1 (100) connected to the host 50. Since the data is stored as the cache data in the LCM within the same mix PK 100 as that including the fiber I/F-PK 212 connected to the host 50, the cache hit ratio in the mix PK 100 is made high.

The operation a3 represents a flow in which the ESCON-I/F-PK 211 directly transfers the data to the host 50. The read data is transferred to the fiber I/F-PK 212 with the host 50 and the data transfer is executed to the host 50 by the fiber I/F-PK 212. At this time, the data transfer can be executed at high speed since it does not pass through the CM (GCM 130 and LCM).

Especially, a triple write operation, in which the operations a1 to a3 are concurrently or sequentially performed, can be performed in the operation a0. Thereby, since the cache data is stored in the GCM 130 and the LCM, comprehensive input/output performance can be improved. Additionally, the operations a1 to a3 are selectively performed according to the situation, so that the input/output performance can be enhanced.

<Example of Data Transfer Processing (2): Pre-Read Processing>

As a second example of the transfer processing in FIG. 18, a description will be made of the case where the disk array apparatus 1 reads the data from the DRV 30 connected to the external disk controller 80, particularly, performs a pre-read processing. The pre-read processing according to the present embodiment is a processing for pre-reading and storing the data from one of the CMs to the other in order to prepare the subsequent data transfer, depending on a connection structure of each unit especially including the CM and the data placement therein in the DKC 10, that is, a processing for relocating the data in the DKC 10.

Before/after the normal data transfer processing responsive to the data input/output request from the other device or at a time of a idle time, the pre-read processing is performed between the CMs through the CM control by the processor and the I/F-PK 210. Thereafter, when the normal data transfer processing occurs, the data subjected to the pre-read processing is used for the data transfer. The I/F-PK 210 having received the input/output request from the other device uses and reads/writes the data relocated on the CM disposed at a position as close as possible to its own PK, thereby performing a response processing to the other device.

The DKC 10 determines object data and/or positions for relocation through the pre-read processing, in consideration of the connection configuration which has each PK including the functional PK 102, the CM including the GCM 130 and the LCM, and the other devices including the host 50 and/or the DRV 30 connected to the DKC 10 and in consideration of the data placement therein and the input/output relationship therebetween. The data stored in one of the CMs through the past data transfer processing is pre-read into the other which it is determined that is effectively located based on the above-mentioned consideration. The connection configuration and the data placement can be recognized by, for example, the processor based on the configuration information and the directory information in the shared memory.

The CM which is effectively located means, for example, the LCM in the same mix PK 100 as that including the I/F-PK 210 having the port connected to the other device located on a transfer source or transfer destination in the data transfer processing, or means the GCM 130 used in the case where the data transfer processing is expected between the mix PKs 100.

An example of the case where the pre-read processing is performed will be described below. (1) A first data transfer processing is normally performed between the DKC 10 and the external device. For example, the DKC 10 reads data (hereinafter referred to as "read data") from the DRV 30 connected to the external disk controller 80 in accordance with the read request from the host 50 and transmits the data to the host 50. At this time, the read data is cached in at least one of the CMs in the DKC 10. (2) The pre-read processing is performed. For example, the read data is effectively relocated between the respective LCMs (each set to the LCMs #3 and #4) in the mix PKs #3 and #4 and the GCM 130 in accordance with the above-mentioned consideration. (3) A second data transfer processing is normally performed. For example, it is assumed that the read request occurs from the host 50 similarly to the first data transfer processing. At this time, the DKC 10 is processed to make the response faster by utilizing the pre-read data. The pre-read processing can be performed also in the input/output to/from the other external device and DRV 30 in the same way.

An operation a4 represents a flow in which the ESCON-I/F-PK 211 having the port connected to the external disk controller 80 in the mix PK #4 within the CL #2 reads data from the DRV 30 of the external disk controller 80 and stores it in the buffer 251 within the own PK, in FIG. 18. For example, operations a5 to a10 may follow the operation a4.

The operation a5 represents a flow in which the ESCON-I/F-PK 211 in the mix PK #4 (100) writes the data from the buffer 251 to the GCM 130 through the LN 103 and the DSW 151. The operation a6 represents a flow in which the ESCON-I/F-PK 211 writes the data to the LCM #4 through the LN 103. The operation a7 represents a flow in which the data is written from the LCM #4 in the mix PK #4 or the GCM 130 to the LCM #3 in the mix PK #3 (100) connected to the host 50. The operation a8 represents a flow in which the data is transmitted from the LCM #4 in the mix PK #4 or the GCM 130 to the host 50 through the fiber I/F-PK 212 in the mix PK #3 (100) connecting the host 50. The operation a9 represents a flow in which the fiber I/F-PK 212 connecting the host 50 transmits the data stored in the LCM #4 within the same mix PK 100 to the host 50. The operation a10 represents a flow in which the data is written from the GCM 130 to the LCM #4 in the mix PK #4 (100).

The operations of the above-described Items (1) to (3) will be described in detail. In the Item (1), firstly, the fiber I/F-PK 212 in the mix PK #3 (100) receives a data read request from the host 50. It is assumed that Read-object data of the data read request resides in the DRV 30 of the external disk controller 80 connected to and located on an extending line of the ESCON-I/F-PK 211 in the mix PK #4 (100). The ESCON-I/F-PK 211 in the mix PK #4 (100) reads the data from the DRV 30 (by the operation a4) and writes the data into any one of the transfer destinations. In the present embodiment, the data transfer between the base PKs 101 is required as shown by the operation a6 in FIG. 12. Therefore, it is assumed that the read data is transferred to and stored in the GCM 130 (by the operation a5). Note that, at this time, the above-mentioned read data may be cached in the LCM #4 within the same mix PK 100 (by the operation a6) and/or the double write processing may be performed to both of the GCM 130 and the LCM #4 (by the operations a5 and a6). Next, the fiber I/F-PK-212 in the mix PK #3 reads the data from the GCM 130 (or LCM #4) and transfers it to the host 50 (by the operation a8). Note that, at this time, the above-mentioned read data may be cached in the LCM #3 in the same mix PK 100 (by the operation a7).

Next, in the Item (2), the DKC 10 performs the pre-read operation among three CMs, that is, among the GCM 130 and the LCMs #3 and #4 in consideration of the above-described connection configuration and so forth. For example, the following first to sixth pre-read operations can be performed according to the situation.

As the first pre-read operation, the read data stored in the GCM 130 is copied or transferred to be stored in the LCM #4 (by the operation a1). During this operation, the data is stored in the LCM #4 located near a side of the external disk controller 80. Therefore, the above data can be utilized, particularly, in the subsequent inputs/outputs to/from the external disk controller 80 and the response to the data input/output is made faster, so that the processing performance can be improved. For example, the input/output data is collected in the LCM #4 when the input/output between the mix PK #4 and the DRV 30 of the external disk controller 80 is slow.

As the second pre-read operation, when the data is not stored in the GCM 130 by the operation a5 and is stored in the CM #4 by the operation a6, the above read data can be copied or transferred from the LCM #4 to the GCM 130 by performing a reverse operation of the operation a10. During this operation, even when the data is stored in the GCM 130 located at a position close to each mix PK 100 and the access of the read data from the other mix PKs #1 and #2 (100) is expected, the read data is easily used and the cache hit ratio is increased. The data can be copied from one of the LCMs in the CLs #1 and #2 to an opposite or remote LCM to the one in the same way.

As a third pre-read operation, in the case where the operation a6 etc. is operated, i.e., where the read data does not reside in the LCM #3 but resides in the LCM #4, the read data can be copied or transferred from the LCM #4 to the LCM #3 in the mix PKs #4 and #3 (100) (by the operation a7). During the operation a7, since the data is stored in the LCM #3 located at a position close to a side of the host 50, the data can be utilized in the subsequent inputs/outputs to/from the host 50. Therefore, the response to the data input/output is made faster and the processing performance can be improved. For example, the data is cached in not only the LCM #4 but also the LCM #3 in performing the input/output processing in which the different kinds of I/F-PKs 211 and 212 are interposed.

As a fourth pre-read operation, when the read data resides in the LCM #3 but does not reside in the LCM #4, the read data is copied or transferred from the LCM #3 to the LCM #4 in a reverse operation to the operation a7. Therefore, by this operation, the same effect as that of the first pre-read operation can be obtained.

Also, as a fifth pre-read operation, the read data is copied or transferred from the GCM 130 to the LCM #3 when the read data does not reside in the LCM #3 (by the operation a7). Due to this operation, the same effect as that of the third pre-read operation can be obtained.

Similarly, as a sixth pre-read operation, when the read data resides in the LCM #3 but does not reside in the GCM 130, the read data is copied or transferred from the LCM #3 to the GCM 130 in a reverse operation to the operation a7. By this operation, the same effect as that of the second pre-read operation can be obtained.

Then, in the Item (3), the fiber I/F-PK 212 in the mix PK #3 (100) receives the same data read request as that of the Item (1) from the host 50. In response to the above-mentioned request, the fiber I/F-PK 212 accesses the LCM #3 in the same PK 100 located at the closest position to the own LCM and transfers the requested data to the host 50 by utilizing the pre-read data (by the operation a9). Thus, the response to the host 50 can be made faster. When the read data is not pre-read in the LCM #3, the pertinent data is read from the GCM 130 and the LCM #4 for processing (by the operation a8). As described above, since the data is relocated between the CMs, the data transfer processing being performed after this can be efficiently performed by utilizing the relocated data.

EFFECTS

The following effects can be achieved from the above-described embodiments.

(i) By combining the base PKs 101 and the functional PKs 102, various characteristic configurations can be incorporated in one control PK (mix PK) 100. Therefore, in accordance with the systems and the requests of users, the kinds and number of I/F ports, the local cache memory capacity, and the number of processors, etc. can be changed, whereby the scalability of the disk array apparatus 1 can be improved. For example, the different kinds of I/Fs can be processed by being integrated in one PK. For example, in the configuration in which the memory PK is incorporated in the PK, the memory thereof can be used as the LCM, so that the data transfer performance can be improved. For example, in the configuration in which the PKs of the channel I/F and the drive I/F are incorporated in one PK, whereby a series of data transfer processing including a channel side and a drive side can be effectively performed. For example, in the configuration in which the processor PK is added in one PK, the processing performance can be improved.

(ii) Each of the functional PK 102 such as the I/F-PK 210 and the base PK 101 has the form corresponding to the hot-swap form, so that the I/F port, the memory, and the processor can be flexibly added/subtracted, respectively, during activation of the system of the disk array apparatus 1. Therefore, the influence on the system is reduced even in adding/subtract any PKs and/or at the time of occurrence of any failure, so that the maintainability and the reliability can be improved.

(iii) When the data is transferred between different kinds of I/Fs in being connected to the external disk controller 80, the data transfer processing can be performed in the same mix PK 100, so that the data transfer performance can be improved.

Another embodiment of the present invention may be provided as one integrated PK of a different-kind-I/Fs mixed type, in which the processing units having the functions of the different kinds of I/Fs (portions corresponding to the functional PKs 102) are incorporated integrally in one control PK 100, instead of hierarchically connecting the control PK 100 to the base PK 100 and the functional PKs 102. The combination of the respective different kinds of I/Fs is fixed so as to correspond to each of the above-described configuration examples and may be provided as the integrated PK, and/or the DKC 10 may be configured by connecting the integrated PK similarly to the above-mentioned embodiment. The configuration according to the present embodiment corresponds to a configuration in which the functional PKs 102 are fixed without inserting/drawing them into/from the disk array apparatus. The communication processing can be performed between the different kinds of I/Fs and with the other PKs through the LN 103 in the integrated PK. Also in this configuration, the communication processing between the different kinds of I/Fs in one integrated PK can be completed, whereby the same effect as that of the above-described mix PK 100 can be obtained.

As described above, the invention made by the present inventors has been specifically explained based on the embodiments. However, needless to say, the present invention is not limited to the above-described embodiments and can be variously altered and modified without departing from the gist thereof.

The present invention can be applied to an information processor such as a storage controller having the I/F processing function with the external device.

What is claimed is:

1. A disk array apparatus including a storage unit and a storage control unit for controlling storing of data to said storage unit, and being controllable in RAID format, the apparatus comprising:

said storage control unit configured by interconnecting control packages including boards, wherein each of said control packages comprises a base package serving as a base for interconnection and a plurality of functional packages hierarchically connected to said base package, individually separate functions being mounted on each of the plurality of functional packages, said base package includes a first junction for said interconnection, a second junction coexisting with and capable of connecting a plurality of different kinds of said functional packages, and an intra-package connection network for communicating between said functional packages and with said storage control unit, each of said functional packages includes a junction for being connected to said base package, and said storage control unit is configured to perform a processing including a transfer of said data by using communication between said functional package and said base package and communication between said base packages, wherein said storage control unit further comprises a global cache memory coupled to each of said control packages via said intra-package connection and configured to be used for caching data during data transfer, wherein said controller packages includes a first controller package and a second controller package, said first controller package includes a first plurality of I/F packages and a first memory package as said functional packages, said first plurality of I/F packages includes an I/F package, which is coupled to an external device corresponding to a first I/F protocol and is configured to perform communication protocol treatment with the external device according to said first I/F protocol, and an other I/F package, which is coupled to a external device corresponding to a second I/F protocol and is configured to perform communication protocol treatment with the external device according to said second I/F protocol, and wherein said first memory package mounts a first local cache memory used to caching data during data transfer, said second controller package includes a second plurality of I/F packages and a second memory package as said functional packages, said second plurality of I/F packages includes an I/F package, which is coupled to an external device corresponding to a first I/F protocol and configured to perform communication protocol treatment with the external device according to said first I/F protocol, and an other I/F package, which is coupled to a external device corresponding to a second I/F protocol and configured to perform communication protocol treatment with the external device according to said second I/F protocol, and wherein said second memory package mounts a second local cache memory configured to be used for caching data during data transfer, wherein said control unit is configured to cache data in said first local cache memory during data transfer based on a first access request from a first host computer being coupled to one of said first plurality of I/F packages to a first storage unit being coupled to one of said first plurality of I/F packages, said control unit is configured to cache data in said global cache memory during data transfer based on a second access request from said first host computer to a second storage unit being coupled to one of said second plurality of I/F packages.

2. The disk array apparatus according to claim 1, wherein said base package is connected to a board having a junction for interconnecting units each including said base package through said first junction, the second junction of said base package has a slot and a connector corresponding to a mechanism for inserting/drawing said functional package, and the junction of said functional package has a shape and a connector corresponding to the slot and the connector of said base package.

3. The disk array apparatus according to claim 1, wherein said storage control unit includes:

a data path control switch for transferring data between said base packages and a processor connection network for communicating between processors in said base packages, the data path control switch and the processor connection network serving as a global connection network for interconnecting said intra-package connection network and communicating between units each including the base package;

said global cache memory connected to said data path control switch; and a channel I/F package corresponding to an I/F for an external device, and a drive I/F package corresponding to an I/F for said storage unit, the channel I/F package and the drive I/F package serving as said functional package.

4. The disk array apparatus according to claim 3, wherein said base package includes a processor connected to said intra-package connection network, and said processor is configured to communicate with another processor in said storage control unit through said intra-package connection network and said processor connection network and to control a processing unit in said functional package.

5. The disk array apparatus according to claim 3, wherein said processor connection network comprises a switch for controlling switching of a processor path for inter-processor communication between the packages.

6. The disk array apparatus according to claim 3, wherein said processor connection network has a configuration in which a control line for communicating between the processors is directly connected between said intra-package connection networks.

7. The disk array apparatus according to claim 3, wherein said processor connection network comprises a switch for controlling a processor path for inter-processor communication between the packages, and a memory connected to said switch and reading/writing control information shared among the processors.

8. The disk array apparatus according to claim 1, wherein said functional package has a structure for being hot-swapped with respect to the second junction of said base package through said junction, and the hot-swapping can be performed while said storage control unit is performing a processing for controlling the storing of said data.

9. The disk array apparatus according to claim 1, wherein said base package has a structure for being hot-swapped with respect to a junction of a board for interconnecting units each including said base package through said first-junction, and the hot-swapping can be performed while said storage control unit is performing a processing for controlling the storing of said data.

10. The disk array apparatus according to claim 1, wherein said first a memory package further mounts a a first memory control circuit connected to said intra-package connection network and controls said first local cache.

11. The disk array apparatus according to claim 1, further comprising:

a processor package serving as said functional package and mounting a processor, wherein control is executed by using the processor in said processor package during a data transfer.

12. The disk array apparatus according to claim 1, further comprising:
   an indicator provided in each of said base package and said functional package and configured to control displays corresponding to a packaging condition and an operation of package maintenance/management,
   wherein a display of said indicator for an object package is controlled so as to indicate an instruction of a maintenance/management operation from said storage control unit or a maintenance/management unit connected to said storage control unit.

13. The disk array apparatus according to claim 1, further comprising:
   a maintenance/management unit connected to said storage control unit,
   wherein said maintenance/management unit is configured to manage configuration information including a connection configuration of said base package and said functional package and, at a time of mounting/detaching each of the packages, to refer to an ID of the mounted/detached package and said configuration information to execute a configuration check.

14. The disk array apparatus according to claim 1,
   wherein, said storage control unit is configured to consider a connection configuration, which includes each package including said functional package, each cache memory including said global cache memory and said first local cache memory and said second local cache memory, and an other device connected to the outside, and to consider a relocation of data on the connection configuration before receiving a data input/output request, and then to copy or transfer data stored in said first local cache memory to a said second local cache memory between respective cache memories, thereby performing a processing for relocating said data, and
   said package receiving the data input/output request from said other device is configured to use and input/output data relocated in said cache memory disposed at a position close to the own package, thereby performing a processing for responding to said other device.

15. The disk array apparatus according to claim 1, further comprising each of said first plurality of I/F packages and said second plurality of I/F packages including:
   a circuit constituting a port for the outside and performing a protocol treatment corresponding to the I/F;
   a connector for connecting said port; and
   an adapter connected to said intra-package connection network and configured to execute I/F control including both of a DMA-data transfer processing and control of said port.

* * * * *